US012071720B2

(12) United States Patent
Ai et al.

(10) Patent No.: US 12,071,720 B2
(45) Date of Patent: Aug. 27, 2024

(54) AIR DUCT CONVERSION DEVICE AND CLOTHING TREATING DEVICE

(71) Applicants: QINGDAO HAIER LAUNDRY ELECTRIC APPLIANCES CO., LTD., Shandong (CN); HAIER SMART HOME CO., LTD., Shandong (CN)

(72) Inventors: Leilei Ai, Shandong (CN); Wenwei Li, Shandong (CN); Benfu Xing, Shandong (CN); Shaolei Yi, Shandong (CN); Zhiwei Zhao, Shandong (CN)

(73) Assignees: QINGDAO HAIER LAUNDRY ELECTRIC APPLIANCES CO., LTD., Shandong (CN); HAIER SMART HOME CO., LTD., Shandong (CN)

(*) Notice: Subject to any disclaimer, the term of this patent is extended or adjusted under 35 U.S.C. 154(b) by 966 days.

(21) Appl. No.: 16/967,089

(22) PCT Filed: Jan. 31, 2019

(86) PCT No.: PCT/CN2019/074114
§ 371 (c)(1),
(2) Date: Aug. 3, 2020

(87) PCT Pub. No.: WO2019/149240
PCT Pub. Date: Aug. 8, 2019

(65) Prior Publication Data
US 2021/0040674 A1 Feb. 11, 2021

(30) Foreign Application Priority Data
Feb. 1, 2018 (CN) .......................... 201810103577.3

(51) Int. Cl.
*D06F 58/08* (2006.01)
*D06F 58/20* (2006.01)
*F16K 11/052* (2006.01)

(52) U.S. Cl.
CPC .............. *D06F 58/08* (2013.01); *D06F 58/20* (2013.01); *F16K 11/052* (2013.01)

(58) Field of Classification Search
CPC .................................................... F16K 11/052
(Continued)

(56) References Cited

U.S. PATENT DOCUMENTS 4,388,766 A * 6/1983 Sanderson .............. D06F 58/20
34/235
4,549,362 A * 10/1985 Haried .................... D06F 58/48
34/467

(Continued)

FOREIGN PATENT DOCUMENTS

CN        2540430 Y     3/2003
CN      102031660 A     4/2011

(Continued)

OTHER PUBLICATIONS

International Search Report (PCT/ISA/210) issued on Apr. 8, 2019, by the State Intellectual Property Office of the P.R. China as the International Searching Authority for International Application No. PCT/CN2019/074114.

(Continued)

*Primary Examiner* — Avinash A Savani
*Assistant Examiner* — Dana K Tighe
(74) *Attorney, Agent, or Firm* — Buchanan Ingersoll & Rooney PC

(57) ABSTRACT

An air duct conversion device comprises an air duct baffle installed on the air duct in a manner of capable of relatively rotating; an output shaft of a motor is connected with the air (Continued)

duct baffle through a linkage mechanism, to drive the air duct baffle to rotate around the shaft through the linkage mechanism in the rotating process of the output shaft of the motor, such that the air duct baffle switches to move between a first position and a second position. Through the above setting, under the driving of the linkage mechanism, the air duct baffle in the air duct correspondingly swings and rotates along with the rotation of the output shaft of the motor, to control the corresponding opening and closing of different openings in the air duct, to achieve the purpose of controlling the reversal of direction of the air flow in the air duct.

20 Claims, 16 Drawing Sheets

(58) Field of Classification Search
USPC .......................................................... 454/159
See application file for complete search history.

(56) References Cited

U.S. PATENT DOCUMENTS

| | | | | |
|---|---|---|---|---|
| 5,095,927 | A | * | 3/1992 | Thompson ................ B08B 3/02 134/155 |
| 9,752,265 | B2 | * | 9/2017 | Bae ......................... D06F 58/20 |

FOREIGN PATENT DOCUMENTS

| | | | |
|---|---|---|---|
| CN | 102517859 | A | 6/2012 |
| CN | 103422318 | A | 12/2013 |
| CN | 105177915 | A | 12/2015 |
| CN | 105316919 | A | 2/2016 |
| CN | 106350978 | A | 1/2017 |
| CN | 108085941 | A | 5/2018 |
| CN | 208038870 | U | 11/2018 |
| CN | 208038875 | U | 11/2018 |
| CN | 208038878 | U | 11/2018 |
| CN | 208038879 | U | 11/2018 |
| CN | 208041159 | U | 11/2018 |
| CN | 208151722 | U | 11/2018 |
| CN | 208151723 | U | 11/2018 |
| CN | 108950976 | A | 12/2018 |
| JP | 2008110134 | A | 5/2008 |
| JP | 5297322 | B2 | 9/2013 |

OTHER PUBLICATIONS

Written Opinion (PCT/ISA/237) issued on Apr. 8, 2019, by the State Intellectual Property Office of the P.R. China as the International Searching Authority for International Application No. PCT/CN2019/074114.

* cited by examiner

AIR DUCT CONVERSION DEVICE AND CLOTHING TREATING DEVICE

TECHNICAL FIELD

The present disclosure belongs to the technical field of household appliances, specifically relates to an air duct conversion device, and further relates to a clothing treating device installed with the above air duct conversion device.

BACKGROUND

The drying and washing all-in-one machine in the prior art generally adopts a condensing clothes drying manner in a drying mode, that is to say, a closed air duct is adopted. Heating drying air heated by a condenser is sent to a drum filled with clothes, moist air which seizes moisture from clothes is sent back to an evaporator for dehumidification, the dehumidified air is heated again by the condenser, and is sent to the drum, the process is repeated and moisture on the clothes is constantly brought away until the clothes are dry. After drying, cooling is required, the temperature in the drum is reduced to a proper temperature, to ensure that the user may not be scalded.

The drying and washing all-in-one machine in the prior art generally adopts a water-cooled type or a compressor type in a cooling mode, tap water or a compressor is utilized to drive, to lower the temperature in the drum. However, the tap water-type cooling method is low in cooling efficiency, the cooling time is long, and water resource is simultaneously wasted; and as to the condenser-type cooling mode, although the efficiency is high, and the time is short, the cost is extremely high.

Further, the applicant designed a clothing treating device possessing two sets of clothing treating equipment before. The two sets of clothing treating equipment can respectively dry clothes; however, in the prior art, the drying equipment can only dry clothes in a single clothing treating equipment; therefore, when two sets of drying equipment are added on the clothing treating device, the size of the whole device structure is enlarged, the number of equipment is increased, thereby leading to increased product cost and increased occupied space.

In view of this, the present disclosure is hereby proposed.

SUMMARY

The technical problem to be solved in the present disclosure is to overcome shortcomings of the prior art, and provide a joint of an air duct connecting beam, such that the motor and the air duct baffle are connected with the connecting beam through a joint, and the motor can drive the air duct baffle to rotate. Another objective of the present disclosure is to provide an air duct conversion device, to achieve the purpose of correspondingly controlling the reversal of the air flow in the air duct.

In order to solve the above technical problem, a basic conception of the technical solution adopted in the present disclosure is as follows:

A joint of an air duct connecting beam is provided. The periphery of the joint is provided with a groove for the inserting connection between the joint and the connecting beam, the joints are further provided with a clamping hole vertical to the groove, and the joints are respectively installed and fixed in the hollow parts at two ends of the connecting beam. Further, the front part of the joint is transited in an arc shape, two ends of the middle part of the joint are respectively provided with a fixed boss which protrudes outwards, such that the thickness of the joint is larger than the thickness of the connecting beam. Preferably, the front part of the joint is disconnected along an axis direction, and the front part and the rear part of the fixed boss are both provided with two axially symmetrical claws, to control the opening and closing of the front part of the joint. Further, the middle position of the periphery of the joint is concave inwards to form a groove, the groove is matched with the hollow part of the connecting beam, such that the joint is connected with the connecting beam in an inserting manner through the groove. Further, the hollow part of the connecting beam is set to be stair-stepping along an axis, and includes a big caliber part and a small caliber part. Further, the big caliber part of the hollow part is matched with the joint, and the small caliber part is matched with the groove of the joint; the joint is embedded into the hollow part from the big caliber part, the groove of the joint is aligned with the direction of the small caliber part, and advances forwards, such that the joint is installed in the hollow part, and is fixed and connected in an inserting manner with the connecting beam. Further, a clamping hole of the joint penetrates through the middle part, and the clamping hole is of a cylindrical structure. Further, the middle position of the side wall inside the cylindrical clamping hole is provided with multiple circumferential bulges which protrude inwards, and the multiple bulges are distributed uniformly, thereby facilitating installation and dead lock of the motor and the air duct baffle. Further, the columnar clamping hole is sunken towards one arc-shaped side of the joint to form a concave opening. Further, the rear part of the joint is provided with a spring installation joint which protrudes outwards, and the end, far away from the small caliber part, of the hollow part is correspondingly provided with a spring extending head, such that the rear part of the joint is connected with the connecting beam through the spring.

Another objective of the present disclosure is to provide an air duct baffle of the air duct conversion device, such that the air duct baffle rotates under the driving of the air duct conversion device, to open or close different air ducts. To solve the above technical problem, the basic concept of the technical solutions adopted in the present disclosure is as follows:

An air duct baffle of an air duct conversion device includes a baffle body, wherein one side of the baffle body is provided with a baffle shaft which protrudes towards two ends and which allows connection between the baffle body and the air duct conversion device; and a frame, wherein the frame wraps three sides, except the baffle shaft, of the baffle body. Further, the upper end of the baffle shaft of the air duct baffle is stair-stepping, and includes a first shaft section and a second shaft section, wherein the diameter of the second shaft section is greater than the diameter of the first shaft section, the top end of the first shaft section is connected with the sealing cover of the housing, and the second shaft section is connected with the other end of the first shaft section and extends axially along the first shaft section. Further, the sealing cover is installed with a shaft sleeve, and the first shaft section of the baffle shaft penetrates through the shaft sleeve, such that the baffle shaft is installed in the shaft sleeve to rotate. Further, the second shaft section penetrates through the adaptor of the air duct device, and is connected with the adaptor, and the air duct baffle rotates under the driving of the adaptor. Further, multiple side grooves which are concave inwards are arranged at a side, far away from the baffle, of the baffle shaft, the side grooves are distributed uniformly along an axial direction, and the grooves are matched with the fixed device for fixing the air duct conversion device. Further, the shape and size of the baffle body are matched with the shape and size of the inlet and outlet of the air duct, to open or close the air duct. Preferably, the baffle body is provided with multiple horizontal reinforcing ribs which are distributed uniformly. Further, the edge of the baffle body is provided with multiple uniformly distributed openings, to facilitate injection molding of the frame. Further, the frame is of a rubber material. Further, the periphery of the frame is concave inwards to form a V-shaped groove. Preferably, the circumference of the frame is matched with the opening of the baffle body, to install the baffle body.

Another objective of the present disclosure is to provide a connecting beam of an air duct conversion device, such that the motor and the adaptor which is connected with an air duct baffle are connected with a connecting beam, to achieve the purpose that the motor drives the air duct baffle to rotate. To solve the above technical problem, the basic concept of the technical solutions adopted in the present disclosure is as follows:

A connecting beam of the air duct conversion device includes: a substrate, wherein two ends of the substrate are respectively provided with a hollow part to place the joint and the spring; a joint, wherein the periphery of the joint is provided with a groove, the joint is provided with a jack socket vertical to the groove; and a spring, wherein two ends of the spring are respectively sleeved on the joint and the substrate, to limit the joint. Further, the hollow parts of the substrate are arranged at two ends of the substrate in a same direction; each hollow part is arranged to be stair-stepping along an axis, and includes a small caliber part, a big caliber part and a connecting part in sequence, wherein the caliber of the small caliber part is smaller than the caliber of the big caliber part. Further, the big caliber part of the hollow part is matched with the joint, and the small caliber part is matched with the groove of the joint. Further, the connecting part of the hollow part is provided with a spring extending head which protrudes towards the direction of the small caliber part along an axial direction. Further, the substrate is rectangular, and the left and right ends of the substrate are transited in an arc shape; the middle of the substrate is provided with trapezoid reinforcing bulges which protrude outwards. Preferably, the periphery of the substrate is folded downwards to form a folded edge, to strengthen the intensity of the substrate. Further, the front part of the joint is transited in an arc shape, the upper and lower ends of the middle part of the joint respectively protrude outwards to form a fixed boss, such that the thickness of the joint is larger than the thickness of the substrate. Further, the middle position of the periphery of the joint is concave inwards to form a groove, and the joint is installed in the hollow part; the joint is embedded into the hollow part from the big caliber part of the hollow part, the groove of the joint is aligned with the small caliber part, and advances forwards, such that the joint is connected with the substrate in an inserting manner. Further, the rear end of the joint is provided with a spring installation extending head which protrudes outwards along an axial line, and the spring installation joint of the joint is matched with the spring extending head of the hollow part. Further, one end of the spring is sleeved on the spring installation joint of the joint and is abutted against the rear end of the joint, and the other end is sleeved on the spring extending head of the hollow part and is abutted against the substrate, such that the inserting connection between the joint and the substrate is tighter under the acting force of a spring, and falling off of a joint is prevented.

Another objective of the present disclosure is to provide an adaptor used for the air duct conversion device, to reduce the shift motion distance of the air duct conversion device and improve rotating precision. To solve the above technical problem, the basic concept of the technical solutions adopted in the present disclosure is as follows:

An adaptor for an air duct conversion device is provided, wherein two ends of the adaptor are respectively provided with a coupling shaft and a coupling sleeve, the coupling shaft and the connecting beam of the air duct conversion device are connected in a manner of rotating around the shaft, and the coupling sleeve and the air duct baffle of the air duct conversion device are fixedly connected in a manner of incapable of rotating relatively. Further, the axis of the coupling shaft and the axis of the coupling sleeve are in parallel with each other and are both set to be on the same side of the adaptor. Further, the axis of the coupling shaft and the axis of the coupling sleeve are in parallel with each other and are both set to be vertical to the extension direction of the adaptor. Further, the coupling shaft is a sleeve structure which protrudes and extends towards one side from the adaptor, and one end of the sleeve structure is open to allow corresponding insertion of the baffle shaft of the air duct conversion device, and the other end is provided with a jack socket to allow the baffle shaft to penetrate out. Further, the adaptor is provided with a countersink groove which allows installation of the lock nut, the countersink groove is set to be co-axial with the coupling sleeve, and is arranged at two opposite sides of the adaptor, the countersink groove is communicated with the coupling sleeve through a jack socket, and the countersink groove, the jack socket and the coupling sleeve are all arranged coaxially; preferably, the opening part of the countersink groove is provided with a ring of convex ribs which protrude outwards and which are set to exceed the side face corresponding to the adaptor. Further, the periphery of the coupling sleeve is provided with multiple reinforcing ribs which are distributed at intervals and which extend along the parallel direction of the axis of the sleeve structure, and the lower end of the reinforcing rib extends to the adaptor, and the upper end extends to the end part of the sleeve structure. Further, the circumferential cross section of the sleeve structure is non-circular, such that an inserting connection and fixation in a manner of incapable of rotating relatively are formed after the baffle shaft is correspondingly connected in an inserting manner; preferably, the circumferential cross section of the sleeve structure is part of a circle intercepted by two parallel line segments. Further, the adaptor is a columnar structure which protrudes and extends towards one side of the adaptor, the axis of the columnar structure is vertical to the extension direction of the adaptor, the height of the columnar structure is set to be in parallel with the reducing shaft, and the cross section of the columnar structure is circular. Further, the middle of reducing shaft of the columnar structure is provided with a ring of grooves which extend along an outer wall of the adaptor, to allow corresponding inserting connection of the bulge on the joint of the coupling beam; and the extending surface of the groove is vertical to the axis of the reducing shaft.

Another objective of the present disclosure is to provide a shaft sleeve structure to install the air duct conversion device, to rapidly install the air duct baffle and install the shaft sleeve in a replaceable manner. To solve the above technical problem, the basic concept of the technical solutions adopted in the present disclosure is as follows:

A shaft sleeve structure for the installation of the air duct conversion device is provided, wherein the side wall of the air duct is provided with an installation groove, the installation groove is connected in an inserting manner and fixed with a shaft sleeve with a non-circular periphery, and the shaft sleeve is provided with an installation hole which allows corresponding inserting connection of the baffle shaft of the air duct baffle. Further, the extension direction of the installation groove is vertical to the side wall of the air duct, the hollow part of the installation groove allows corresponding inserting connection and fixation of the bearing sleeve, the axial direction of the installation hole of the bearing sleeve is set to be vertical to the side wall of an air duct. Further, the cross section of the inner wall of the installation groove is square, and the peripheral cross section of the bearing sleeve is a square which is correspondingly matched and fit with the installation groove. Further, the peripheral cross section of the bearing sleeve is a square with a chamfer arranged at the corner, and the corner is any shape selected from a circular arc and a straight line. Further, the peripheral cross section of the bearing sleeve is a regular hexagon, the cross section of the inner wall of the installation groove is a square, and the distance between two opposite sides of the regular hexagon is equal to the length of the side of the square. Further, the side wall of the air duct is provided with a first retaining rib and a second retaining rib which are crossed and arranged at a certain angle, and the installation groove is arranged at the position at which the first retaining rib and the second retaining rib are intersected. Further, the axis of the bearing sleeve installed in the installation groove is coincided with the intersection point of the extension directions of the first retaining rib and the second retaining rib. Further, the first retaining rib and the second retaining rib protrude to extend towards the inside of the air duct from the side wall of the air duct, and the first retaining rib extends along the first position of the air duct baffle of the air duct conversion device, and the second retaining rib extends along the second position of the air duct baffle of the air duct conversion device, such that the air duct baffle rotates around the baffle shaft between the first retaining rib and the second retaining rib. Further, the cross section of the installation hole on the bearing sleeve is a circular hole which is in corresponding inserting connection with the baffle shaft, and the diameter of the circular hole is set to be equal to the diameter of the baffle shaft.

Another objective of the present disclosure is to provide an air duct conversion device, to achieve the purpose of controlling the reversal of the air flow inside the air duct.

Another objective of the present disclosure is to provide a compound drying and washing all-in-one machine of a joint of the above air duct connecting beam.

In order to solve the above technical problem, a basic conception of the technical solution adopted in the present disclosure is as follows:

An air duct conversion device includes an air duct baffle which can be installed on the air duct in a relatively rotating manner, wherein the output shaft of the motor is connected with the air duct baffle through the linkage mechanism, to drive the air duct baffle to rotate around a shaft through a linkage mechanism in the rotating process of the output shaft of the motor, such that the air duct baffle is switched to move between the first position and the second position. Further, the linkage mechanism can include an adaptor and a connecting beam which can be connected in a relatively rotating manner, the connecting beam is in inserting connection with the output shaft of the motor in a manner of capable of relatively rotating around the output shaft of the motor, and the adaptor is in inserting connection with the baffle shaft of the air duct baffle in a manner of incapable of relatively rotating. Further, one end of the air duct baffle is provided with a baffle shaft which extends horizontally towards the two sides, and the baffle shaft and two side walls of the air duct are connected in an inserting manner and fixed relatively, such that the baffle can be installed in the air duct in a relatively rotating manner; and one end of the baffle shaft is fixed and connected with the adaptor after penetrating through the air duct. Further, two ends of the adaptor are respectively provided with a coupling shaft and a coupling sleeve, the coupling shaft is connected with the connecting beam of the air duct conversion device in a manner of capable of rotating around the shaft, and the coupling sleeve and the air duct baffle of the air duct conversion device are fixedly connected in a manner of incapable of rotating relatively; the extension direction of the adaptor is vertical to the axial direction of the baffle shaft; and the axis of the coupling shaft and the axis of the coupling sleeve are in parallel with each other and are both set to be vertical to the extension direction of the adaptor. Further, a first shaft section and a second shaft section are arranged in sequence from outside to inside at the end part of the baffle shaft which penetrates out of the air duct, the cross section of the second shaft section is noncircular, the inner circumferential surface of the coupling sleeve of the adaptor is correspondingly fit and connected in an inserting manner with the outer wall of the second shaft section, such that the second shaft section and the adaptor cannot be correspondingly connected in an inserting manner and fixed in a manner of incapable of rotating relatively; the coupling sleeve is internally provided with a jack socket which allows the first shaft section to pass through, the first shaft section is provided with threads, such that the first shaft section and the lock nut are in thread engagement and fixation, and the adaptor is fastened and fixed between the lock nut and the second shaft section; preferably, the peripheral diameter of the second shaft section is larger than the diameter of the jack socket; further preferably, the adaptor is provided with a countersink groove which allows installation of the lock nut, the countersink groove is set to be co-axial with the coupling sleeve, and is arranged at two opposite sides of the adaptor, the countersink groove is communicated with the coupling sleeve through a jack socket, and the countersink groove, the jack socket and the coupling sleeve are all arranged coaxially. Further, two ends of the connecting beam are respectively fixedly installed with a first joint and a second joint, the first joint and the coupling shaft of the adaptor can be in inserting connection and fixation in a manner of relatively rotating around the shaft, and the second joint and the output shaft of the motor can be in inserting connection and fixation in a manner of relatively rotating around the shaft. Further, the connecting beam includes: a substrate, wherein two ends of the substrate are respectively provided with a hollow part to place the joint and the spring; a joint, wherein the periphery of the joint is provided with a groove, and the joint is provided with a jack socket vertical to the groove; and a spring, wherein two ends of the spring are respectively sleeved on the joint and the substrate, to limit the joint. Further, the output shaft of the motor is of an eccentric shaft structure, the eccentric shaft structure includes an eccentric shaft section which rotates along the motor center, the eccentric shaft section and the second joint of the connecting beam can be in inserting connection and fixation in a manner of capable of relatively rotating around the shaft, to drive the connecting beam to move in the rotating process of the eccentric shaft section, and further to drive the air duct baffle to rotate around the baffle shaft through the adaptor. Further, a side wall of the air duct is provided with an installation groove, the installation groove is internally fixedly installed with a bearing sleeve with a non-circular periphery, and the bearing sleeve is provided with an installation hole which allows the baffle shaft of the air duct baffle to be correspondingly connected in an inserting manner; preferably, the cross section of the inner wall of the installation groove is square, and the peripheral cross section of the bearing sleeve is a square which is correspondingly matched and fit with the installation groove; further preferably, the cross section of the periphery of the bearing sleeve is a square with a chamfer arranged at the corner, and the corner is any shape selected from a circular arc and a straight line.

Another objective of the present disclosure is to provide a clothing treating device which includes a washing bucket and an air duct communicated with the washing bucket, wherein the air duct is internally installed with any of the above air duct conversion devices.

Further, the clothing treating device in the present disclosure includes a first clothing treating bucket and a second clothing treating bucket, and the first clothing treating bucket and the second clothing treating bucket are respectively provided with a clothes delivery opening, to respectively deliver the to-be-treated clothes to the corresponding first clothing treating bucket and the second clothing treating bucket. The clothing treating device is further provided with an air duct, the air inlet end of the air duct is respectively communicated with the first air inlet of the first clothing treating bucket and the second air inlet of the second clothing treating bucket through the air duct conversion device at the air inlet end, and the air duct conversion device at the air outlet end of the air duct is respectively communicated with the first air outlet of the first clothing treating bucket and the second air outlet of the second clothing treating bucket.

After the above technical solution is adopted, the present disclosure has the following beneficial effects compared with the prior art.

The joint is simple in structure and low in cost, the motor, the air duct baffle and the joint are connected, and constitute an air duct conversion device together with an air duct connecting beam. The opening and closing of the air duct are realized through driving of the motor and rotating of the baffle, thereby improving cooling efficiency. Meanwhile, since the overall structure is compact, the occupied space is small, the air duct conversion device is convenient in assembly, thereby improving the production efficiency of the air duct conversion device.

The air duct baffle rotates under the driving of the air duct conversion device, to realize the opening and closing of the air duct, then the purpose of lowering the temperature inside the inner drum can be rapidly achieved, therefore, the cooling efficiency is high and the cost is low.

The frame adopts a rubber material, and plays a buffer role when the air duct baffle rotates to a fixed position.

The connecting beam is connected with the motor and the air duct baffle respectively, to constitute an air duct conversion device, and the connecting beam rotates under the driving of the motor, to drive the air duct baffle to rotate, so as to realize the opening and closing of the air duct, then the purpose of lowering the temperature inside the inner drum can be rapidly achieved, therefore, the cooling efficiency is high and the cost is low.

Through arranging the above adaptor on the air duct conversion device, two different inserting connection structures are integrated on the adaptor, thereby further ensuring that two ends of the adaptor are respectively correspondingly connected with different components in manners of capable of rotating relatively and incapable of rotating relatively, and achieving the purpose of driving the air duct baffle of the air duct conversion device.

Through adding an adaptor on the air duct conversion device, the connecting beam can drive the adaptor to rotate in a large angle only when the connecting beam swings at a small angle, thereby ensuring the rotating range of the air duct baffle, and reducing the movement path of the air duct conversion device.

Through setting a bearing sleeve which can be detachably installed on the side wall of an air duct, the bearing of the air duct reversing device can be replaced detachably, thereby achieving the purpose of detachable installation and rapid assembly and replacement of a bearing sleeve of a baffle shaft.

Through setting the bearing sleeve to be of a structure with the peripheral cross section being a regular hexagon, after the bearing sleeve is installed into the installation groove, the bearing sleeve cannot rotate relative to the installation groove, such that the baffle shaft which is connected in an inserting manner in the bearing shaft is supported and positioned, and can rotate around the shaft relative to the air duct.

Through the above setting, under the driving of the linkage mechanism, the air duct baffle in the air duct correspondingly swings and rotates along with the rotation of the output shaft of the motor, to control the corresponding opening and closing of different openings in the air duct, to achieve the purpose of controlling the reversal of direction of the air flow in the air duct.

After adding the above air duct conversion device in the air duct, the conversion baffle is driven by a motor to rotate correspondingly, to realize mutual switching between ventilation and condensation of the air duct of the washing and drying all-in-one machine and the outside or gas circular flow and heating, thereby achieving the purpose of controlling the direction of the air flow in the air duct, and correspondingly adjusting the drying procedure of the washing and drying all-in-one machine.

Through respectively arranging an air duct conversion device at two ends of the air duct, a single air duct can provide a circulating air flow for drying clothes to the first clothing treating bucket or the second clothing treating bucket, respectively, thereby further achieving the purpose of sharing one air duct by two sets of clothing drying treating equipment, and achieving the purpose of sharing the same clothing drying air duct on the clothing treating device possessing two sets of clothing treating equipment.

A detailed description will be given below on the specific embodiments of the present disclosure in combination with accompanying drawings.

DESCRIPTION OF THE DRAWINGS

As a part of the present disclosure, accompanying drawings are used for providing a further understanding of the present disclosure, schematic embodiments and descriptions thereof of the present disclosure are used for explaining the present disclosure, rather than constituting an improper limit to the present disclosure. Obviously, accompanying drawings described below are merely some embodiments, for those skilled in the art, other drawings can be obtained based on these drawings without any creative effort. In the drawings.

Figure 1:
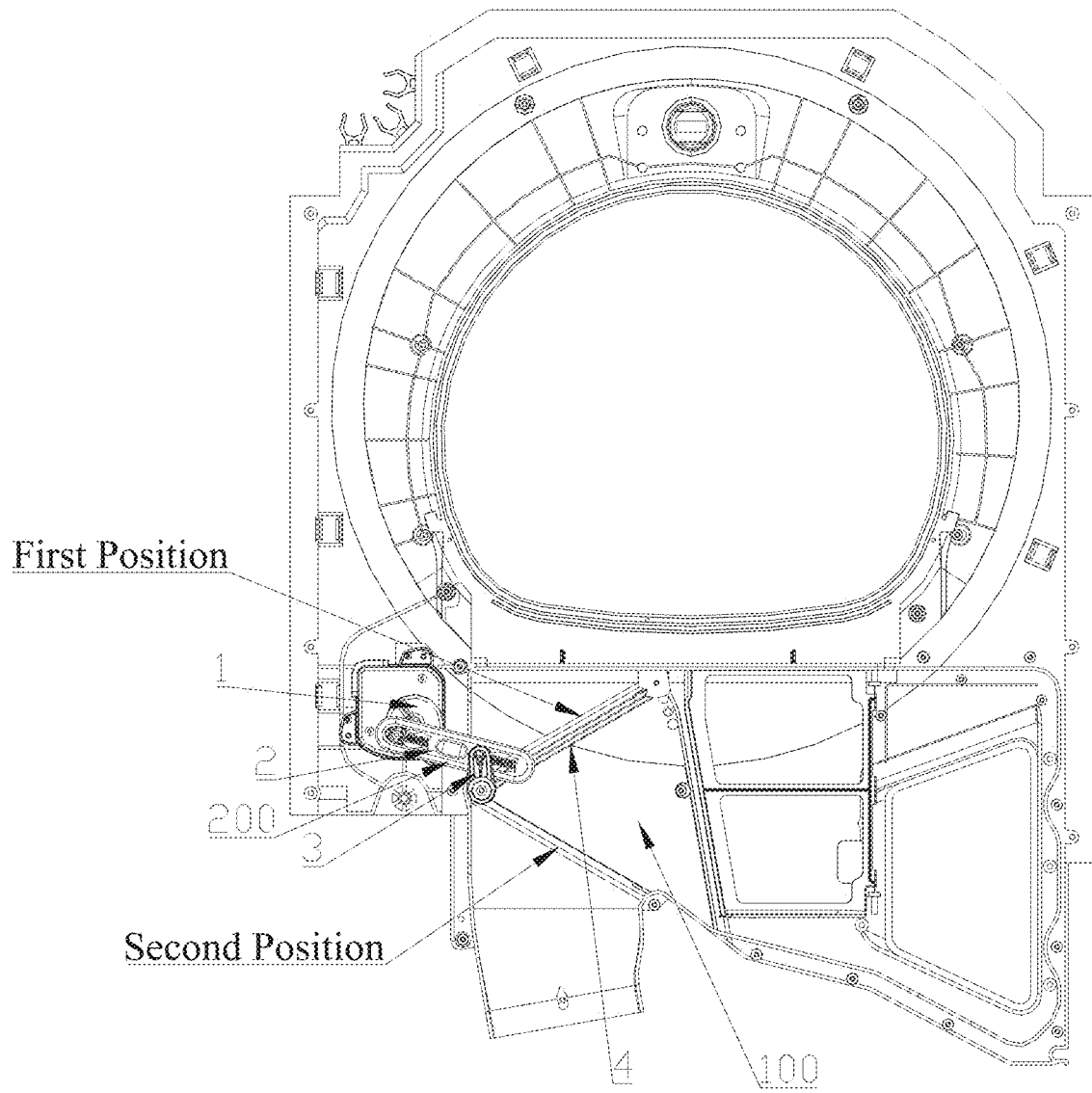
FIG. 1 is an installation structural schematic diagram when an air duct conversion device is in a first position in an embodiment of the present disclosure.

It should be noted that, these drawings and text descriptions are not aiming at limiting a conception range of the present disclosure in any form, but to describe concepts of the present disclosure for those skilled in the art with a reference to specific embodiments.

DESCRIPTION OF THE EMBODIMENTS

In order to make the object, technical solutions and advantages of the embodiments in the present disclosure clearer, a clear and complete description will be given below on technical solutions in the embodiments in combination with accompanying drawings in the embodiments of the present disclosure. The following embodiments are used for describing the present disclosure, rather than for limiting the scope of the present disclosure.

As shown in FIG. 1 to FIG. 21, an embodiment of the present disclosure introduces an air duct conversion device 200 which includes an air duct baffle 4 which is installed on the air duct 100 in a manner of being capable of rotating relatively; an output shaft of a motor 1 is connected with the air duct baffle 4 through a linkage mechanism, to drive the air duct baffle 4 to rotate around the shaft through the linkage mechanism in the rotating process of the output shaft of the motor 1, such that the air duct baffle 4 switches to move between a first position and a second position.

Through the above setting, under the driving of the linkage structure, the air duct baffle in the air duct correspondingly swings and rotates along with the rotation of the output shaft of the motor, thereby controlling the corresponding closing or opening of different openings in the air duct and achieving the purpose of controlling the reversal of direction of the air flow in the air duct.

In the embodiment of the present disclosure, the linkage mechanism includes an adaptor 3 and a connecting beam 2 which are connected in a manner of capable of rotating relatively, the connecting beam 2 is in inserting connection with the output shaft of the motor 1 in a manner of capable of rotating around the output shaft of the motor 1, and the adaptor 3 is in inserting connection with the baffle shaft 411 of the air duct baffle 4 in a manner of incapable of rotating relatively.

As shown in FIG. 1, when the air duct baffle 4 is at the first position, the output shaft of the motor 1 is at a position far away from the air duct 100, the connecting beam 2 is driven to a position far away from the air duct 100, the adaptor 3 moves to the uppermost end, such that the air duct baffle 4 rotates upwards along the shaft to the first position, to close an opening at the upper end of the air duct 100, and the air duct 100 is communicated with the opening at the lower end.

Figure 2:
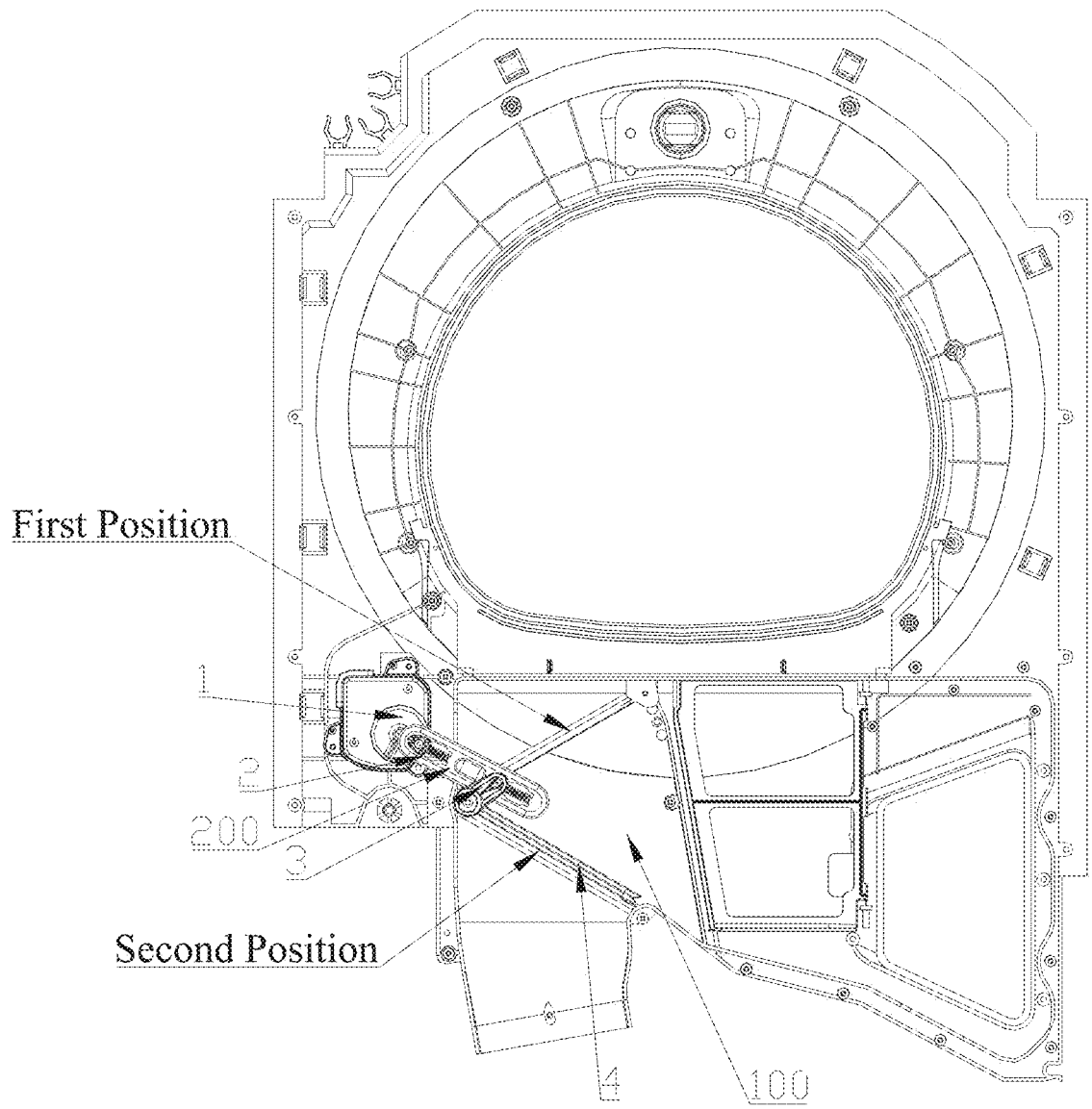
FIG. 2 is an installation structural schematic diagram when an air duct conversion device is in a second position in an embodiment of the present disclosure.
Figure 3:
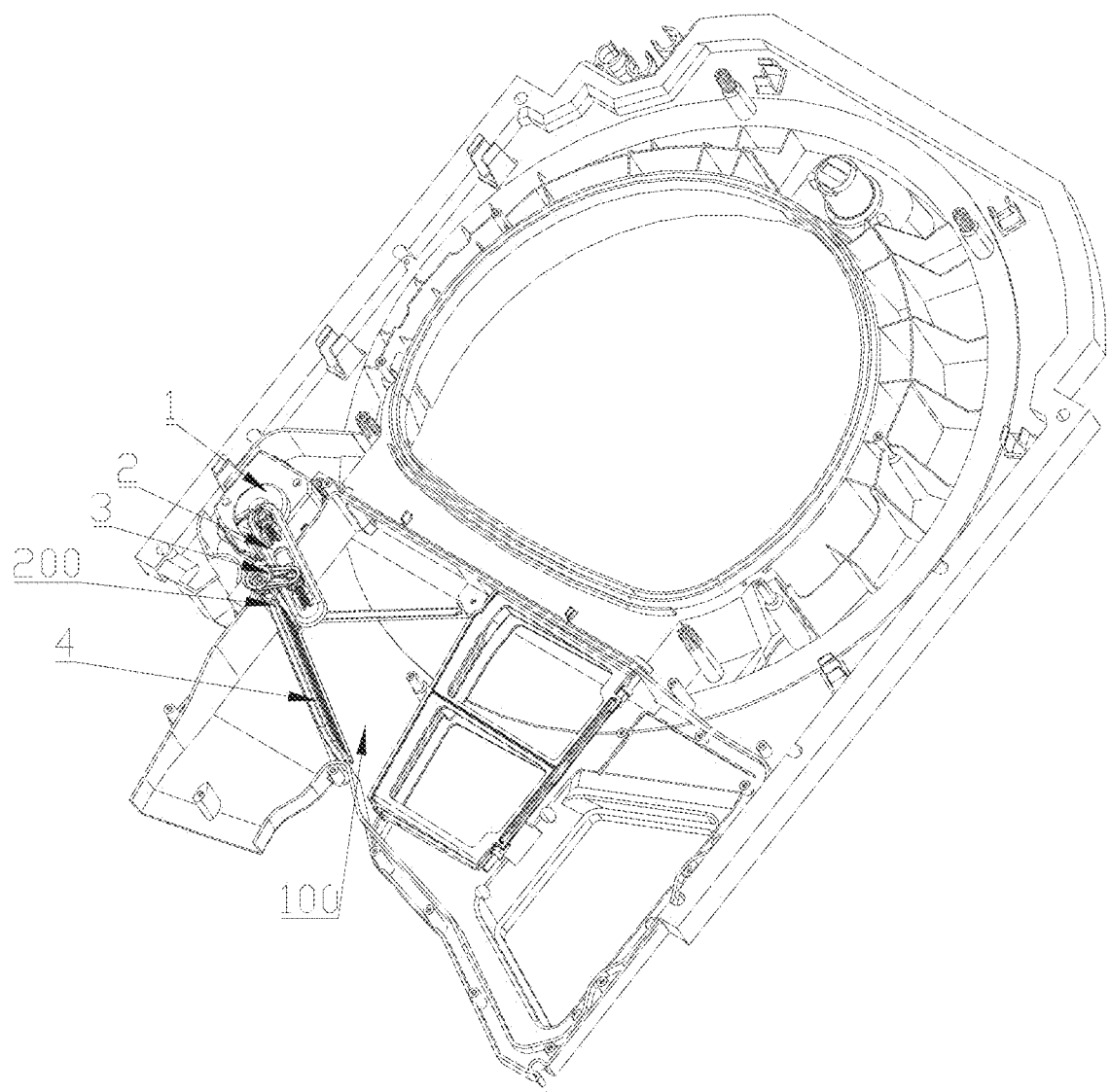
FIG. 3 is an installation structural schematic diagram of an air duct conversion device in an embodiment of the present disclosure.

As shown in FIG. 2, when the air duct baffle 4 is at the second position, the output shaft of the motor 1 is at the position close to the air duct 100, the connecting beam 2 is driven to the position close to the air duct 100, and the adaptor 3 moves to the lowermost end, such that the air duct baffle 4 rotates downwards along the shaft to the second position, to close an opening at the lower end of the air duct 100, and the air duct 100 is communicated with the opening at the upper end.

In an embodiment of the present disclosure, one end of the air duct baffle 4 is provided with a baffle shaft 411 which extends horizontally towards two sides, the baffle shaft 411 and the two side walls of the air duct 100 are correspondingly in inserting connection and fixation, such that the baffle 4 can be installed in the air duct 100 in a manner of capable of rotating relatively; and one end of the baffle shaft 411 penetrates through the air duct 100 and is fixedly connected with the adaptor 3.

In an embodiment of the present disclosure, two ends of the connecting beam 2 are respectively fixedly installed with a first joint 21 and a second joint 22, the first joint 21 is in inserting connection with the coupling shaft 31 of the adaptor 3 in a manner of capable of relatively rotating around the shaft, and the second joint 22 is in inserting connection with the eccentric shaft section 111 of the motor 1 in a manner of capable of relatively rotating around the shaft.

In the embodiment of the present disclosure, the output shaft of the motor is of an eccentric shaft structure, the eccentric shaft structure includes an eccentric shaft section 111 which rotates around the motor center, the eccentric shaft section 111 and the second joint 22 of the connecting beam 2 are in inserting connection in a manner of capable of relatively rotating around a shaft, to drive the connecting beam 3 to move in the rotating process of the eccentric shaft section 111, and further to drive the air duct baffle 4 to rotate around the baffle shaft 411 through an adaptor 3, and further to control the eccentric shaft section of the output shaft of the motor to swing and rotate mutually between the uppermost end and the lowermost end, and to correspondingly control the mutual switching of the air duct baffle between the first position and the second position.

Embodiment 1

As shown in FIG. 1 to FIG. 6, the present embodiment introduces a shaft sleeve structure for the installation of a baffle shaft of the air duct conversion device, one end of the air duct baffle 4 is provided with a baffle shaft 411 which extends horizontally towards the two sides, the baffle shaft 411 and two side walls of the air duct 100 are correspondingly in inserting connection and fixation, such that the baffle 411 is installed in the air duct 100 in a manner of capable of rotating relatively; one end of the baffle shaft 411 after penetrates through the air duct 100 and is fixedly connected with the adaptor 3. The side wall 101 of the air duct is provided with an installation groove 203, the installation groove 203 is connected in an inserting manner and fixed with a bearing sleeve 204 with a non-circular periphery, and the bearing sleeve 204 is provided with an installation hole 205 which allows the baffle shaft 411 of the air duct baffle 4 to be correspondingly connected in an inserting manner.

Through setting a bearing sleeve which is detachably installed on the side wall of an air duct, the bearing of the air duct reversing device can be replaced detachably, thereby achieving the purpose of detachable installation and rapid assembly and replacement of a bearing sleeve of a baffle shaft.

In the present embodiment, the extension direction of the installation groove 203 is vertical to the side wall of the air duct, the hollow part in the installation groove 203 allows corresponding inserting connection and fixation of the bearing sleeve 204, and the axial direction of the installation hole 205 of the bearing sleeve 204 is set to be vertical to the side wall 101 of the air duct.

In the present embodiment, the cross section of the inner wall of the installation groove 203 is square, and the peripheral cross section of the bearing sleeve 204 is a square which is in corresponding matching and fitting with the installation groove 203. Through setting the bearing sleeve to be in a direction matched with the installation groove, after the bearing sleeve is correspondingly inserted into the installation groove, the bearing sleeve is installed in a manner of incapable of relatively rotating, thereby ensuring fixed reliability of the bearing sleeve.

In the present embodiment, the peripheral cross section of the bearing sleeve 204 is a square which is provided with a chamfer at each of the corners, and the corner is any shape selected from a circular arc and a straight line. Through setting a corner at the periphery of the bearing sleeve, a gap is formed with the installation groove at the corner of the bearing sleeve, thereby facilitating the user to disassemble and install a bearing sleeve.

Figure 6:
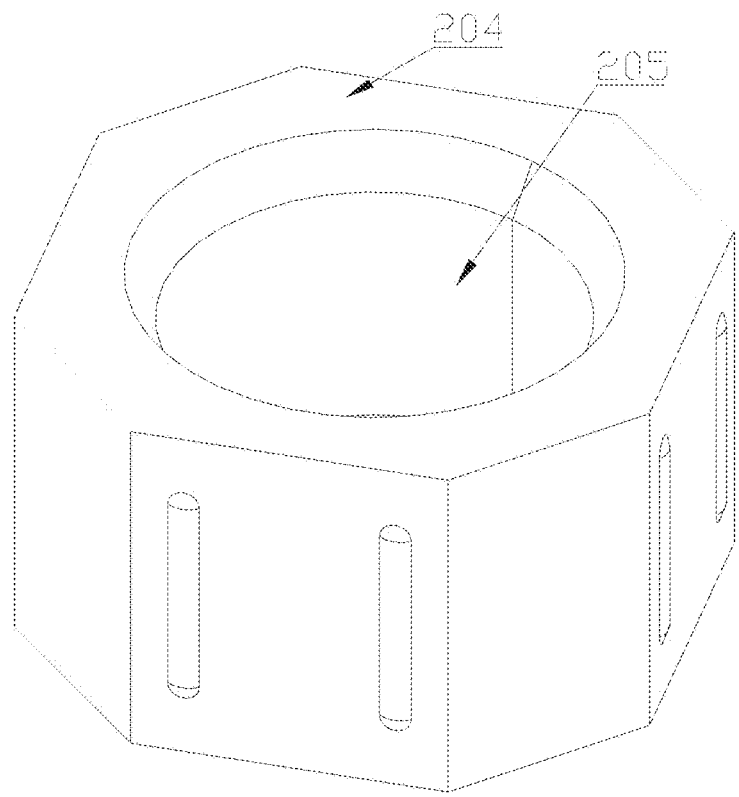
FIG. 6 is a structural schematic diagram of a bearing sleeve in an embodiment of the present disclosure.
Figure 7:
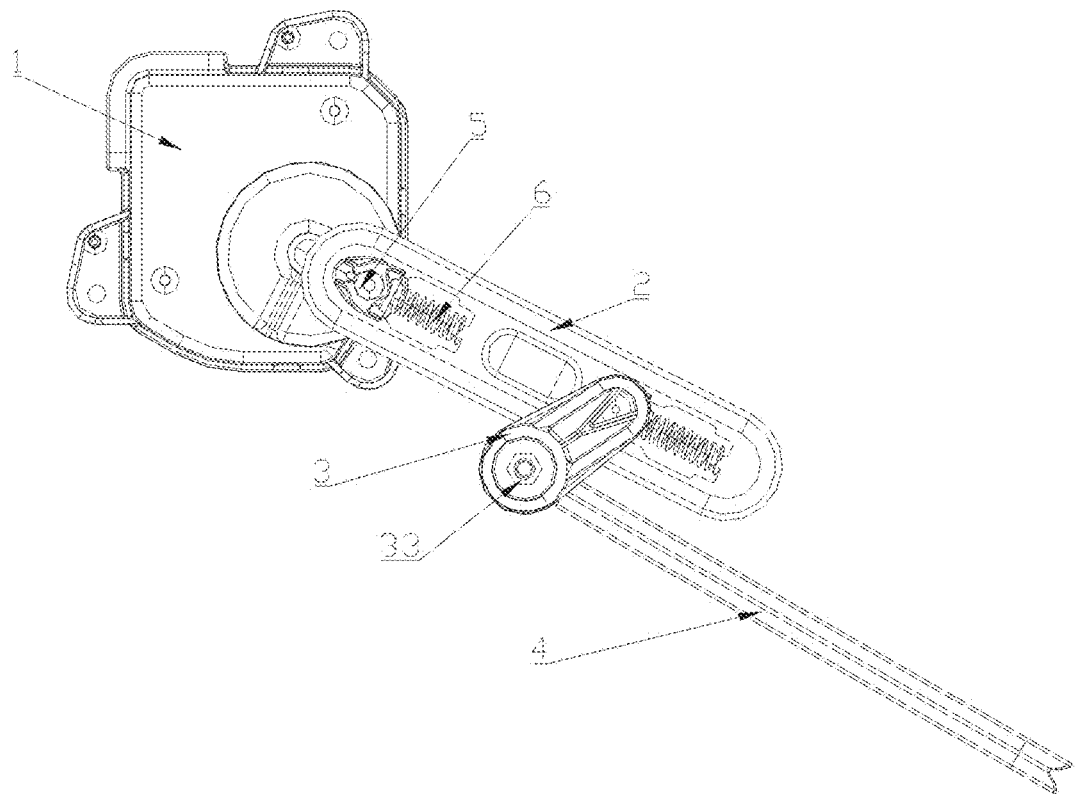
FIG. 7 is a structural schematic diagram of an air duct conversion device in an embodiment of the present disclosure.

As shown in FIG. 6, in the present embodiment, the peripheral cross section of the bearing shaft 204 is a regular hexagon, the cross section of the inner wall of the installation groove 203 is a square, and the distance between two opposite sides of the regular hexagon is equal to the length of the side of the square. Through setting the bearing sleeve to be of a structure with the peripheral cross section being a regular hexagon, after the bearing sleeve is installed into the installation groove, the bearing sleeve cannot rotate relative to the installation groove, such that the baffle shaft which is connected in an inserting manner in the bearing shaft is supported and positioned, and can rotate around the shaft relative to the air duct.

In the present embodiment, the side wall 101 of the air duct is provided with a first retaining rib 201 and a second retaining rib 202 which are crossed and arranged at a certain angle, and the installation groove 203 is arranged at the position at which the first retaining rib 201 and the second retaining rib 202 are intersected.

Figure 4:
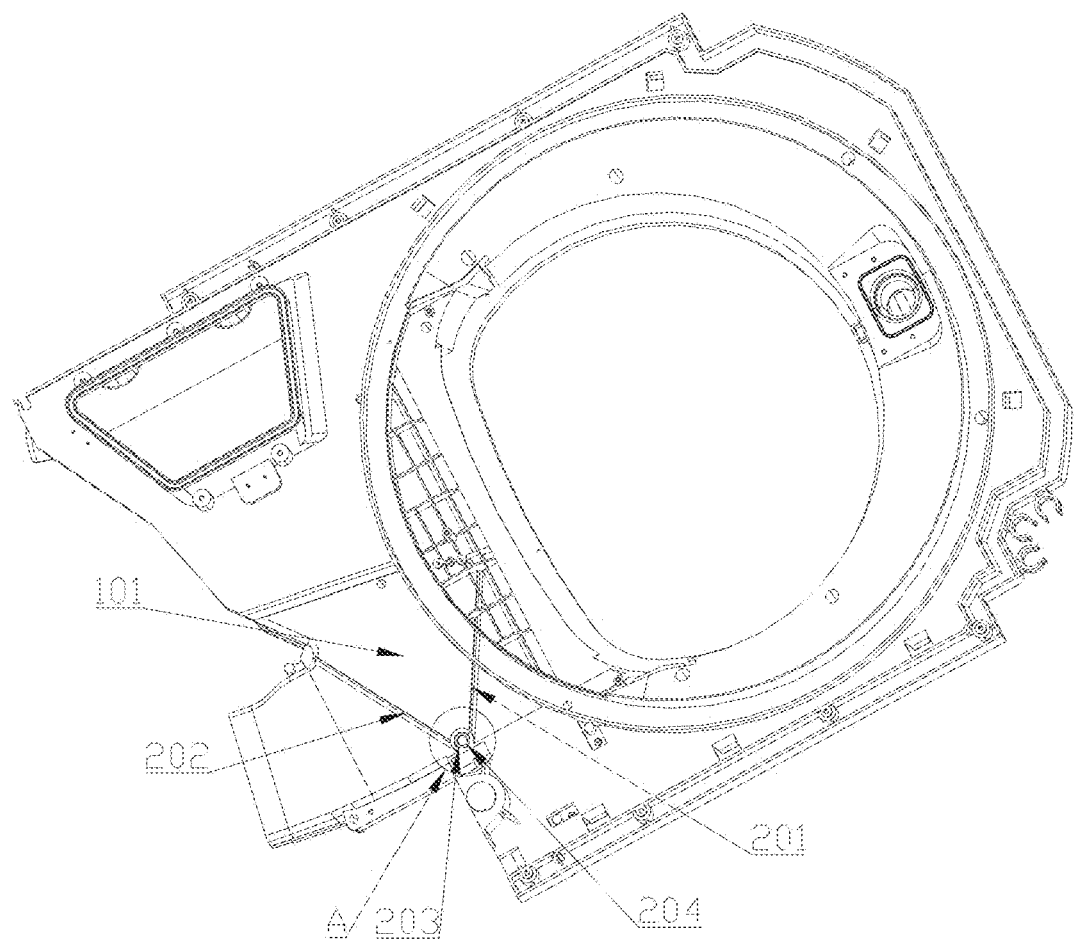
FIG. 4 is an installation structural schematic diagram of a bearing sleeve in an embodiment of the present disclosure.
Figure 5:
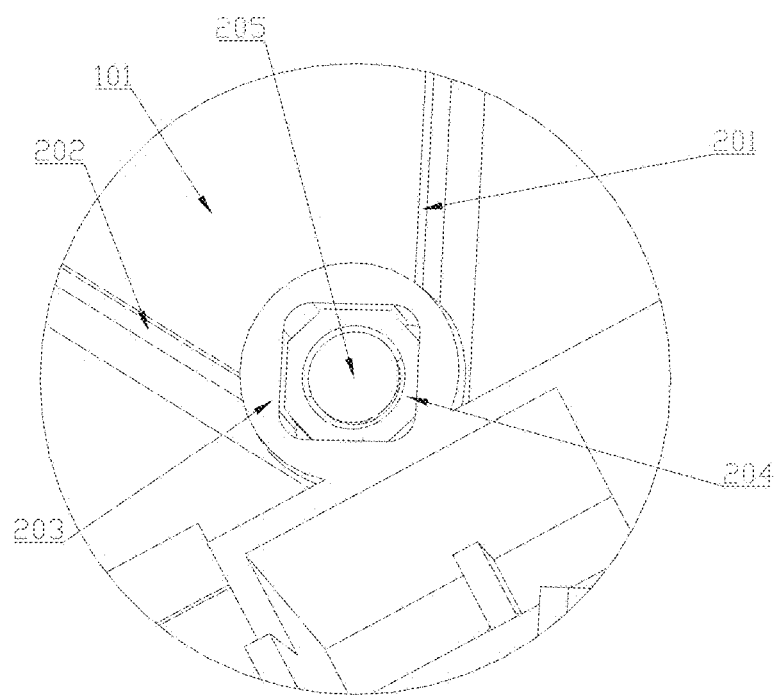
FIG. 5 is an enlarged structural schematic diagram of part A in FIG. 4 in an embodiment of the present disclosure.

As shown in FIG. 4 and FIG. 5, in the present embodiment, the axis of the bearing sleeve 204 installed in the installation groove 203 is coincided with the intersection point of the extension directions of the first retaining rib 201 and the second retaining rib 202. Through arranging the first retaining rib and the second retaining rib which protrude inwards in the air duct, the position of the air duct baffle is limited, thereby preventing the air duct baffle from separating from the limiting position and slipping into other positions in the air duct, and further ensuring the stability of switching operation of the air duct conversion device.

In the present embodiment, the first retaining rib 201 and the second retaining rib 202 protrude to extend towards the inside of the air duct 100 from the side wall 101 of the air duct, and the first retaining wall 201 extends along the first position of the air duct baffle 4 of the air duct conversion device 200, and the second retaining rib 202 extends along the second position of the air duct baffle 4 of the air duct conversion device 200, such that the air duct baffle 4 rotates around the baffle shaft 41 between the first retaining rib 201 and the second retaining rib 202.

In the present embodiment, the cross section of the installation hole 205 on the bearing sleeve 204 is a circular hole which is in corresponding inserting connection with the baffle shaft 411, and the diameter of the circular hole is set to be equal to the diameter of the baffle shaft 411.

Embodiment 2

As shown in FIG. 1 to FIG. 3 and FIG. 7 to FIG. 11, the present embodiment introduces an adaptor 3 for the air duct conversion device, two ends of the adaptor 3 are respectively provided with a coupling shaft 31 and a coupling sleeve 32. The coupling shaft 31 is connected with the connecting beam 2 of the air duct conversion device 200 in a manner of capable of rotating around the shaft, and the coupling sleeve 32 is fixedly connected with the air duct baffle 4 of the air duct conversion device 200 in a manner of incapable of relatively rotating.

Through setting the above adaptor on the air duct conversion device, the adaptor is integrated with two different inserting connection structures, thereby ensuring that two ends of an adaptor are respectively correspondingly connected with different components in a manner of capable or rotating and in a manner of incapable of rotating relatively and achieving the purpose of driving the air duct baffle of the air duct conversion device.

Figure 8:
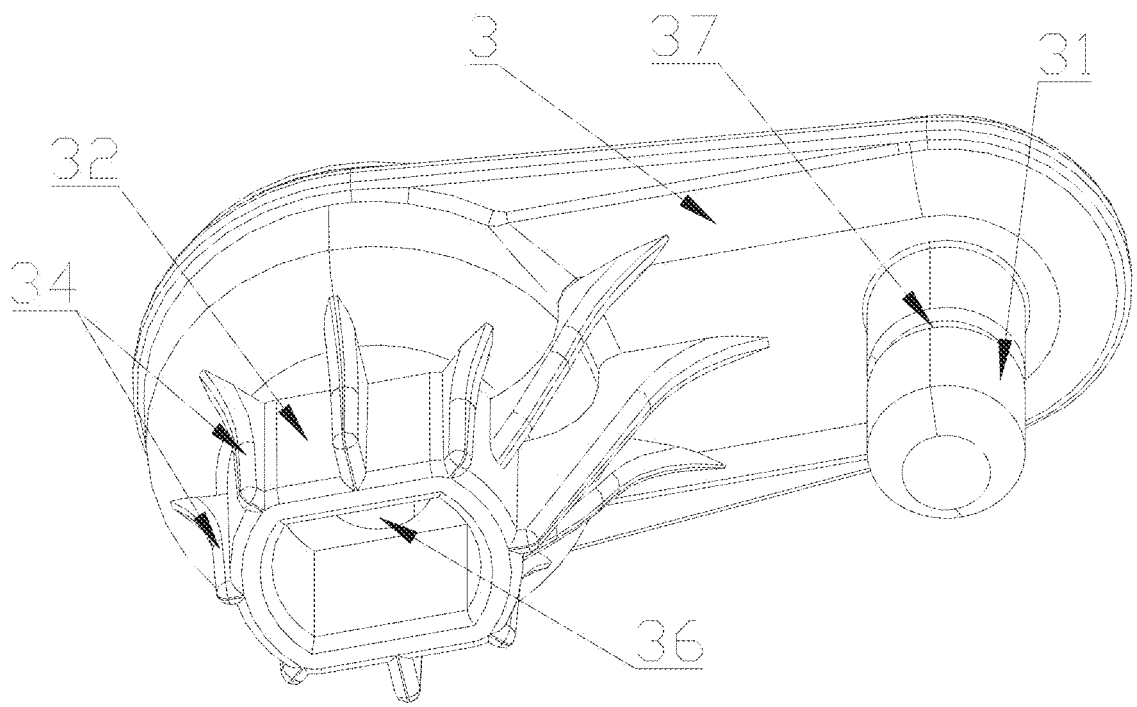
FIG. 8 and FIG. 9 are structural schematic diagrams of an adaptor in an embodiment of the present disclosure.
Figure 9:
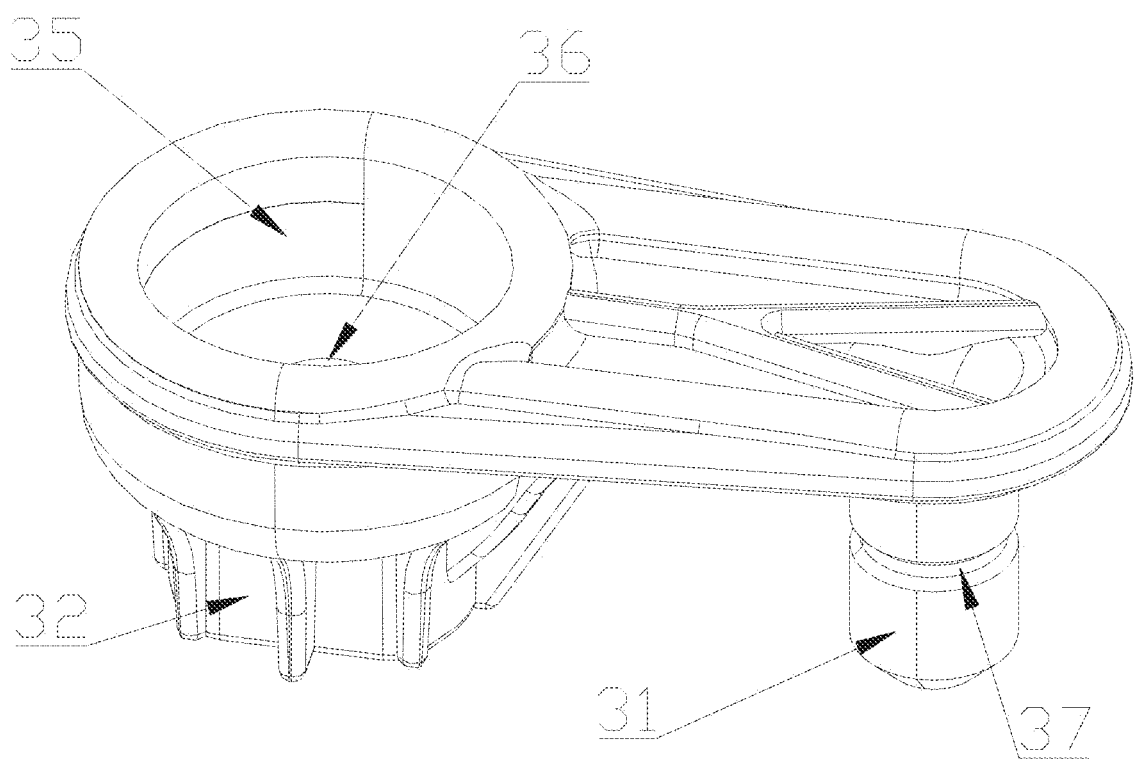
Figure 10:
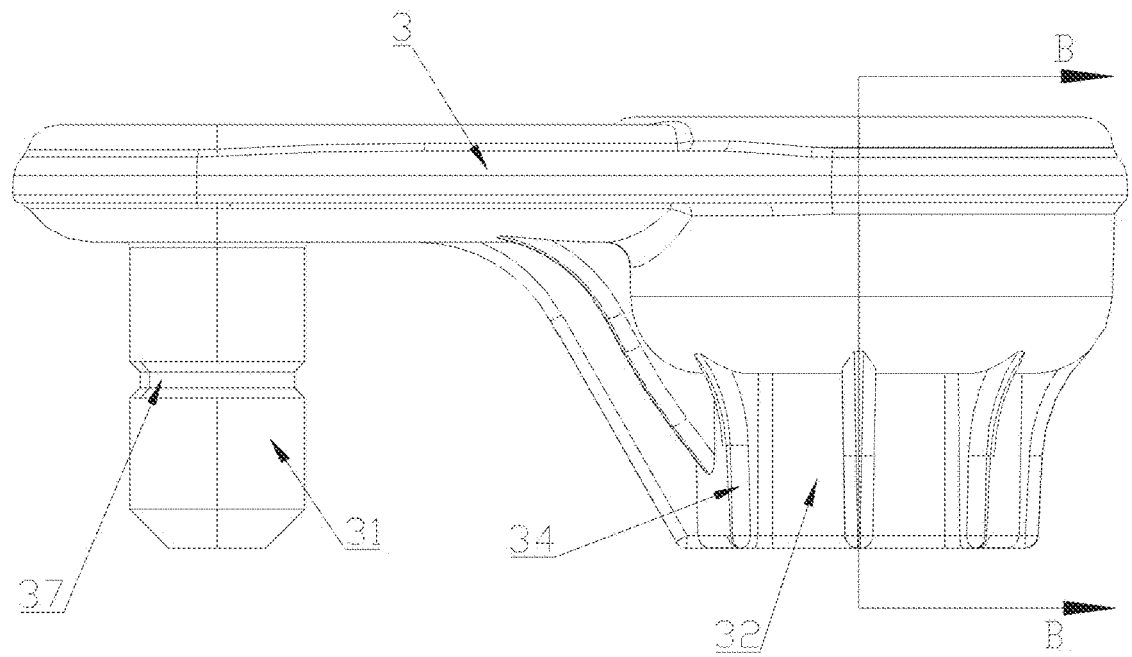
FIG. 10 is a lateral-view structural schematic diagram of an adaptor in an embodiment of the present disclosure.

As shown in FIG. 8 to FIG. 10, in the present embodiment, the axis of the coupling sleeve 32 and the axis of the coupling shaft 31 are arranged to be in parallel, and the coupling sleeve 32 and the coupling shaft 31 are arranged at the same side of the adaptor 3. In the present embodiment, the axis of the coupling shaft 31 and the axis of the coupling sleeve 32 are arranged to be in parallel, and the coupling shaft 31 and the coupling sleeve 32 are both arranged to be vertical to the extension direction of the adaptor 3.

In the present embodiment, the coupling sleeve 32 is a sleeve structure which extends in a protruding manner towards one side from the adaptor, the opening at one end of the sleeve structure allows corresponding insertion of the baffle shaft 411 of the air duct conversion device 100, and the other end is provided with a jack socket 36 for the baffle shaft to penetrate out.

Figure 11:
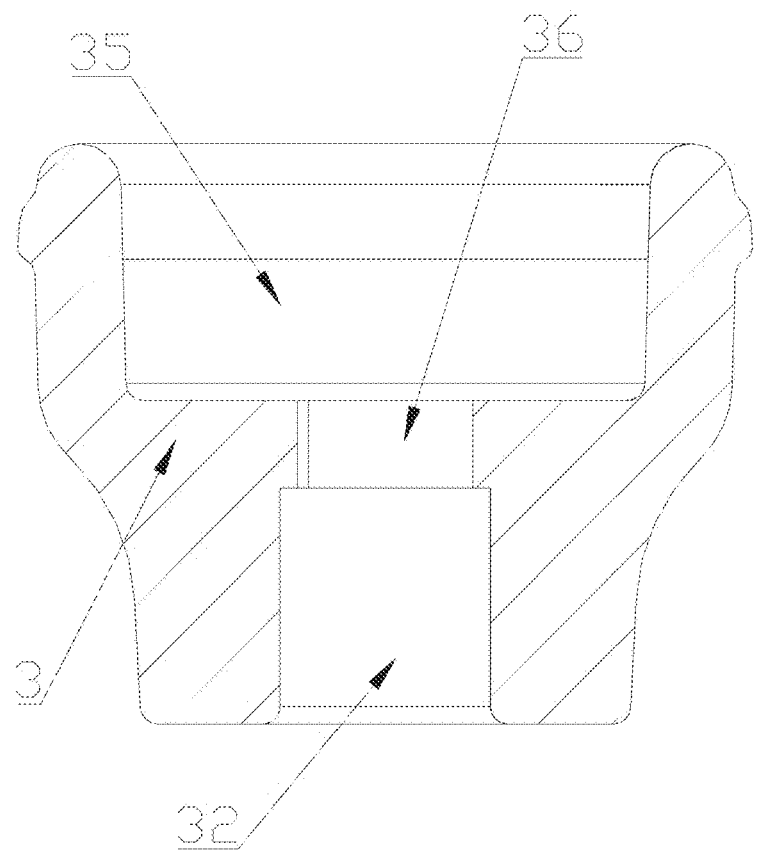
FIG. 11 is a structural schematic diagram of a section B-B in FIG. 10 in an embodiment of the present disclosure.
Figure 12:
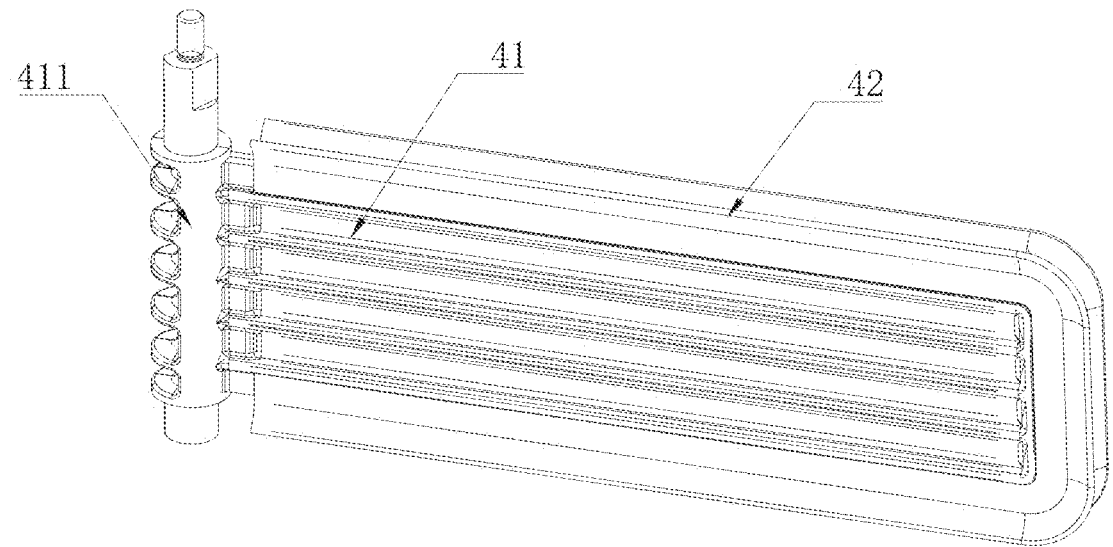
FIG. 12 is a structural schematic diagram of an air duct baffle in an embodiment of the present disclosure.

As shown in FIG. 9 to FIG. 11, in the present embodiment, the adaptor 3 is provided with a countersink groove 35 for the installation of the lock nut 33, the countersink groove 35 is set to be co-axial with the coupling sleeve 32, and is arranged at two opposite sides of the adaptor 3, the countersink groove 35 is communicated with the coupling sleeve 32 through a jack socket 36, and the countersink groove 35, the jack socket 36 and the coupling sleeve 32 are all arranged coaxially. Preferably, the opening part of the countersink groove 35 is provided with a ring of protruding ribs which protrude outwards and which are arranged exceeding the side face corresponding to the adaptor, such that a user can tighten the lock nut in the countersink groove. Through setting a countersink groove on the coupling shaft, the lock nut is embedded in the countersink groove, thereby ensuring that an outer end face of the lock nut does not protrude out of the adaptor, and further improving overall compactness of the air duct conversion device.

As shown in FIG. 8 to FIG. 10, in the present embodiment, the periphery of the coupling sleeve 32 is provided with multiple reinforcing ribs 34 which are distributed at intervals and which extend towards a parallel direction along the axis of the sleeve structure, the lower end of the reinforcing rib 34 extends to the adaptor 3 and the upper end extends to the end part of the sleeve structure.

As shown in FIG. 8, in the present embodiment, the circumferential cross section of the coupling sleeve 32 of the sleeve structure is non-circular, such that after the baffle shaft 411 is correspondingly connected in an inserting manner, an inserting connection and fixation incapable of relatively rotating is formed. Preferably, the circumferential cross section of the coupling sleeve 32 of the sleeve structure is part of a circle intercepted by two parallel segments, that is, the circumferential cross section of the coupling sleeve 32 is an irregular shape which is encircled by two parallel segments at two opposite sides and two symmetrical arc segments at another two opposite sides.

In the present embodiment, the coupling shaft 31 is a columnar structure which extends in a protruding manner towards one side from the adaptor, the axis of the columnar-structure coupling shaft 31 is vertical to the extension direction of the adaptor 3, the height of the columnar-structure coupling shaft 31 is set to be as the same with the height of the coupling sleeve 32, and the cross section of the columnar-structure coupling shaft 31 is circular.

In the present embodiment, the middle of the columnar-structure coupling shaft 31 is provided with a ring of grooves 37 which extend along the outer wall of the adaptor, to allow corresponding inserting connection of the bulge on the joint of the connecting beam 2; and the extending surface of the groove 37 is vertical to the axis of the coupling shaft 31.

Through setting grooves on the coupling shaft, and after the coupling shaft is connected with the corresponding joint, limit fixation is performed through grooves, thereby preventing the coupling shaft from moving along an axial direction and departing from the joint, and achieving the purpose of fixing the coupling shaft in an axial direction.

Through adding an adaptor on the air duct conversion device, the connecting beam can drive the adaptor to rotate in a large angle only when the connecting beam swings at a small angle, thereby ensuring the rotating range of the air duct baffle, and reducing the movement path of the air duct conversion device.

Embodiment 3

As shown in FIG. 3, FIG. 7 and FIG. 12 to FIG. 14, the present embodiment introduces an air duct baffle 4 of an air duct conversion device 200, wherein the air duct baffle 4 includes a baffle body 41 and a frame 42, one side of the baffle body 41 is provided with a baffle shaft 411 which extends horizontally towards two sides, and the frame wraps the three sides, except the baffle shaft 411, of the baffle body. The baffle body 41 and the baffle shaft 411 are set to be integrated, and can rotate together under the driving of the motor 1, to open or close the air duct 100.

In the present embodiment, the air duct conversion device 200 is fixed on a housing through a fixed device, and the air duct baffle 4 switches to move between the first position and the second position, to open or close the air duct 100. Under the mutual effect of the side wall of the air duct and the air duct baffle 4, the gas can only flow along a specified path, thereby avoiding gas leakage.

In the present embodiment, the baffle shaft 411 of the air duct baffle 4 is connected with the fixed device, the adaptor 3 of the air duct conversion device 200 and the side wall of the air duct, respectively, to install and fix the air duct baffle 4. In addition, under the driving of the air duct conversion device 200, the adaptor 3 drives the baffle shaft 411 to rotate, and further drives the whole air duct baffle 4 to rotate.

Figure 13:
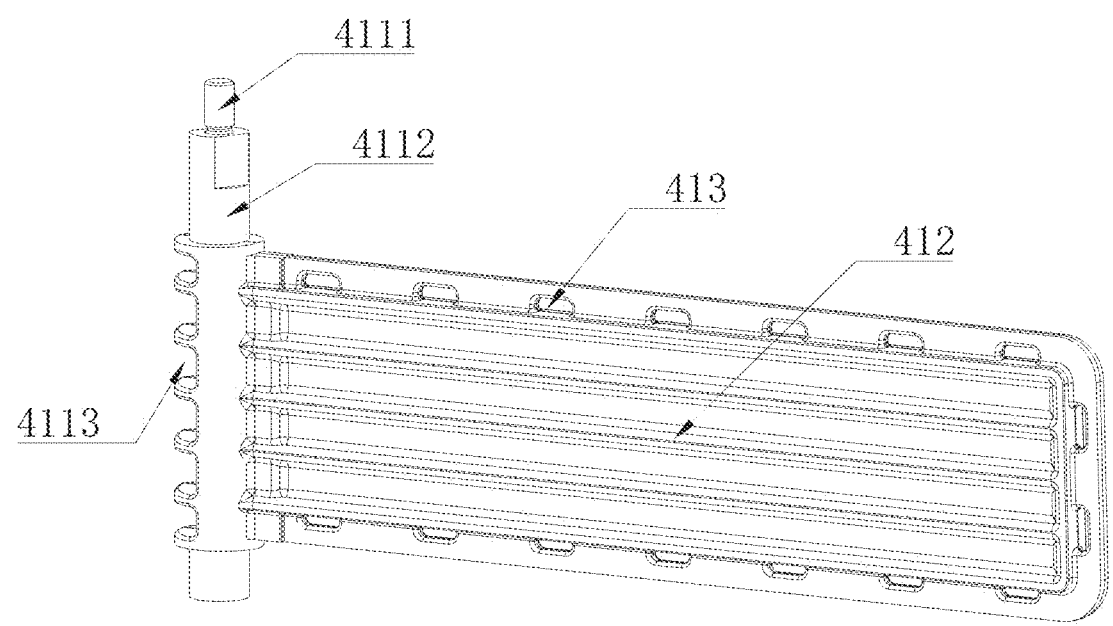
FIG. 13 is a structural schematic diagram of a baffle body in an embodiment of the present disclosure.
Figure 14:
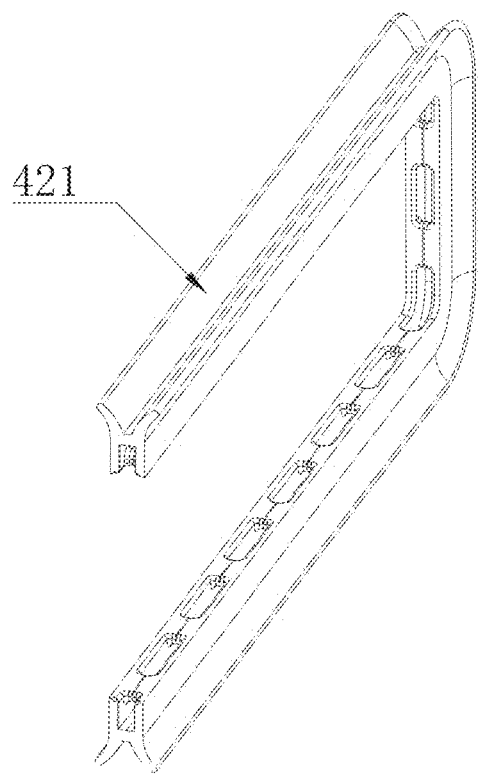
FIG. 14 is a structural schematic diagram of a frame in an embodiment of the present disclosure.
Figure 15:
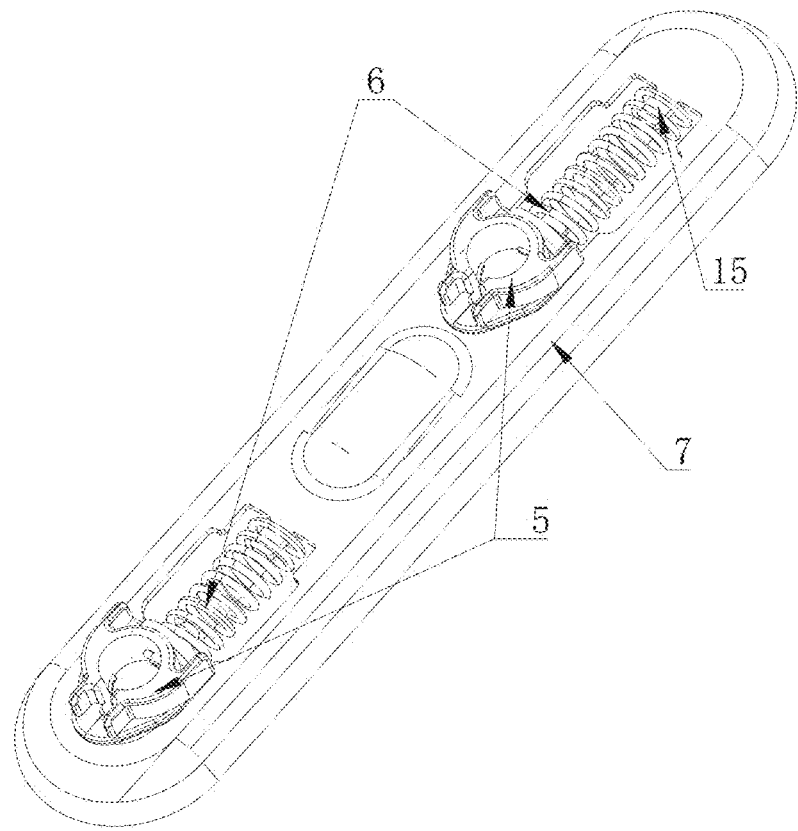
FIG. 15 is a structural schematic diagram of a connecting beam in an embodiment of the present disclosure.
Figure 16:
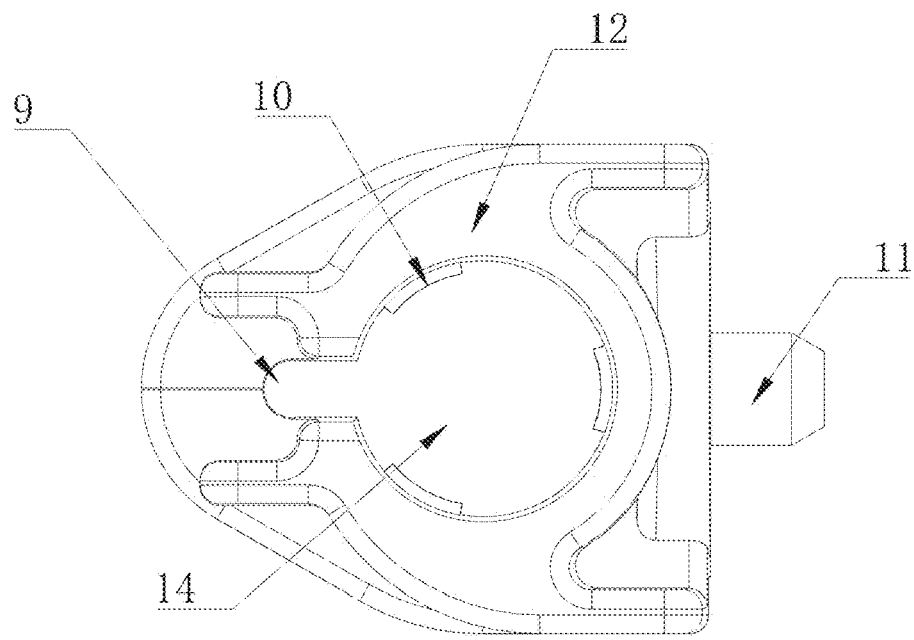
FIG. 16 is a top view of a joint in an embodiment of the present disclosure.
Figure 17:
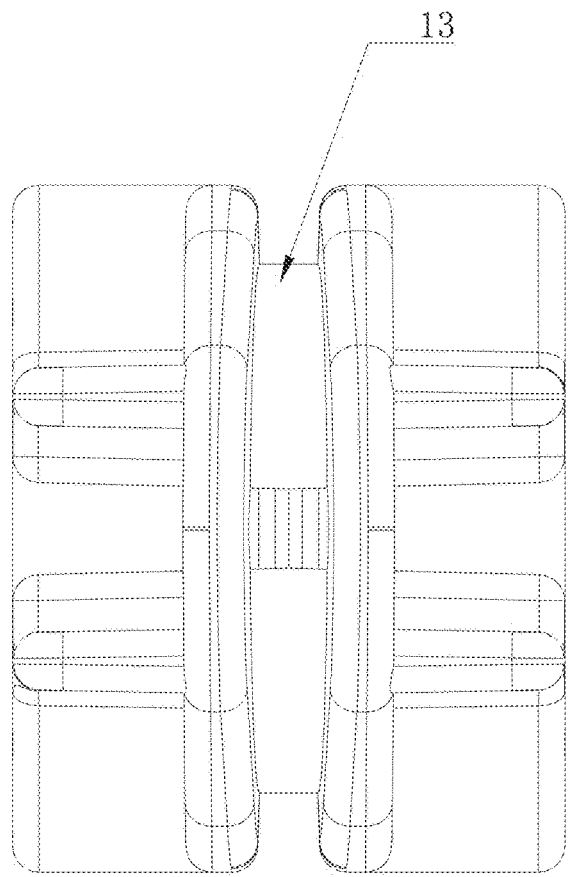
FIG. 17 is a left view of a joint in an embodiment of the present disclosure.
Figure 18:
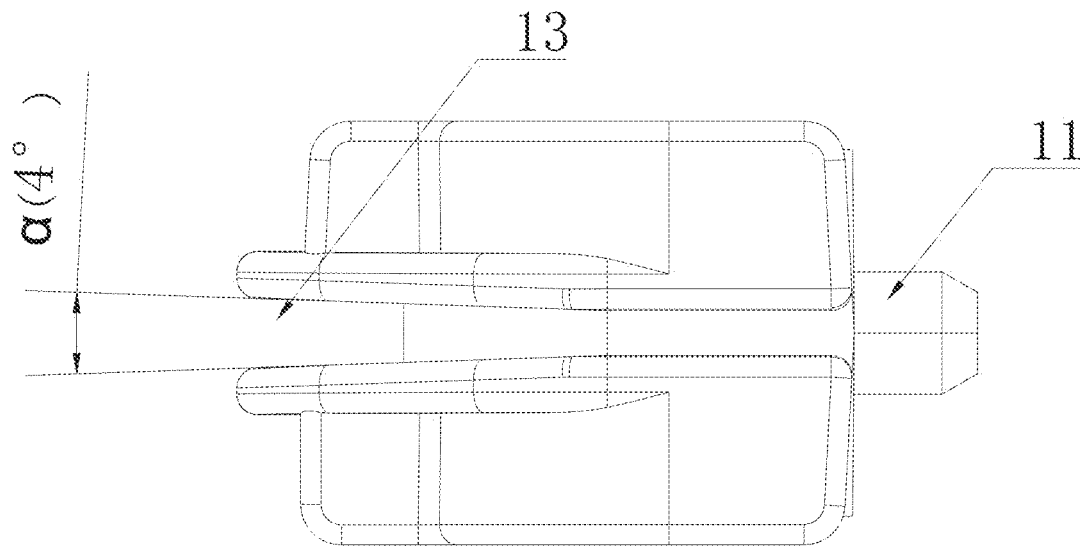
FIG. 18 is a side view of a joint in an embodiment of the present disclosure.

As shown in FIG. 11 and FIG. 13, in the present embodiment, the end part of the baffle shaft 411 penetrating out of the air duct baffle 4 is stair-stepping, the baffle shaft 411 is provided with a first shaft section 4111 and a second shaft section 4112 in sequence from outside to inside. The diameter of the second shaft section 4112 is larger than the diameter of the first shaft section 4111, the top end of the first shaft section 4111 is connected with a side wall of the air duct, the second shaft section 4112 is connected with the other end of the first shaft section 4111 and extends along an axial direction of the first shaft section 4111. The cross section of the second shaft section 4112 is non-circular, the outer wall of the second shaft section 4112 is correspondingly fit with and in inserting connection with the inner circumferential surface of the coupling sleeve 32 of the adaptor 3, such that the second shaft section 4112 is correspondingly in inserting connection and fixation with the adaptor 3 in a manner of incapable of rotating relatively; the first shaft section 4111 penetrates through an inner jack socket 36 of the coupling sleeve 32, the periphery of the first shaft section 4111 is provided with threads, such that the first shaft section 4111 is in thread engagement and fixation with the lock nut 33, and the peripheral diameter of the second shaft section 4112 is greater than the diameter of the jack socket 36.

In the present embodiment, the middle of the baffle shaft 411 of the air duct baffle 4 is provided with multiple side grooves 4113 which are recessed inwards, the side grooves 4113 are distributed uniformly along the axial direction at one side, far away from the baffle body 41, of the baffle shaft 411, and the side grooves 4113 are matched with the fixed device, such that the air duct baffle 4 is fixedly installed with the fixed device.

In the present embodiment, the shape and size of the baffle body 41 of the air duct baffle 4 and the shape and size of the air duct inlet and outlet are the same, such that the air duct baffle 4 can completely block the air duct inlet and outlet, the baffle body 41 is further provided with multiple horizontal reinforcing ribs 412, to enhance the hardness of the baffle body 41, and avoid cracks of the air duct baffle 4 in the moving process. The edge of the baffle body 41 is provided with multiple uniformly distributed openings 413, and the circumference of the frame 42 is matched with the opening 413 of the baffle body 41, for the installation of the baffle body 41.

In the present embodiment, the frame 42 of the air duct baffle is of a rubber material, and the upper and lower end faces and the side end face, far away from the baffle shaft 411, of the frame 42 are concave inwards to form a V-shaped groove 421, thereby facilitating damping and sealing of the air duct baffle.

Embodiment 4

As shown in FIG. 7 and FIG. 15 to FIG. 18, the present embodiment introduces a joint 5 of the air duct connecting beam 2, the joint 5 is respectively placed and fixed in a hollow part 8 at two ends of the connecting beam 2 of the air duct, a clamping hole 14 is arranged in the joint 5, the motor 1 and the adaptor 3 are respectively connected with the joint 5 in an inserting manner through a clamping hole 14, the adaptor 3 is connected with the first joint 21 in an inserting manner, and the motor 1 is connected with the second joint 22 in an inserting manner.

In the present embodiment, the connecting beam 2 includes a substrate 7 and a hollow part 8, the hollow part 8 is arranged at a left end and a right end of the substrate 7, the hollow part 8 is internally installed with a joint 5 and a spring 6, such that the motor 1 and the adaptor 3 are connected with the connecting beam 2.

In the present embodiment, the hollow part 8 is set to be stair-stepping along an axis, and includes a large caliber part and a small caliber part, wherein the caliber of the large caliber part is larger than the caliber of the small caliber part, and the large caliber part is matched with the joint 5. One end, far away from the small caliber part, of the hollow part 8 is provided with a spring extending head 15 protruding outwards, to install the spring 6.

In the present embodiment, the front part of the joint 5 is transited in an arc shape, the upper and lower ends of the middle part of the joint 5 are respectively provided with a fixed boss 12 which protrudes outwards, the front part of the joint 5 is disconnected along an axis direction, and the front part and the rear part of the fixed boss 12 are both provided with two axially symmetrical claws, to control the opening and closing of the front part of the joint 5. The periphery of the joint 5 is concave inwards to form a groove 13, the groove 13 is matched with the small caliber part of the hollow part 8, such that the joint 5 is connected with the substrate 7 in an inserting manner through the groove 13, and the arc-shaped front part of the joint 5 enables the inserting connection between the joint 5 and the substrate 7 to be tighter, thereby facilitating the installation and disassembly of the joint. The spacing between two side walls of the groove 13 is gradually decreased from the front part of the joint 5 to the middle part, and the inclined angle between the two side walls is 4 degrees.

In the present embodiment, the rear part of the joint 5 is provided with a spring installation joint 11, the spring installation joint 11 is corresponding to the spring extending head 15 of the hollow part 8, one end of the spring is connected with the spring installation joint 11 of the joint 5, the other end is connected with the spring extending head 15 of the hollow part 8, the inserting connection between the joint 5 and the substrate 7 is strengthened by utilizing a spring force, to prevent accidental falling off of the joint 5.

In the present embodiment, the middle part of the joint 5 is provided with a clamping hole 14, the clamping hole 14 is of a cylindrical structure, the clamping hole 14 is arranged vertically, and penetrates through the middle part of the whole joint 5 vertically, a notch 10 which is concave towards the front end is arranged at the front end, close to the joint 5, of the clamping hole 14, and the notch 10 and the clamping hole 14 are both arranged to be co-axial with the joint 5.

In the present embodiment, the middle position of the inner wall of the clamping hole 14 is provided with multiple bulges 10 which are arranged in a circumferential direction and which protrude outwards, multiple bulges 10 are uniformly distributed, and are arranged on the same height, and the setting of the bulges 10 can facilitate the installation and dead lock of the motor 1 and the adaptor 3 and the joint 5.

Embodiment 5

As shown in FIG. 7, FIG. 15, and FIG. 19 to FIG. 21, the present embodiment introduces a connecting beam 2 of an air duct conversion device 200, and the connecting beam 2 includes a substrate 7, a joint 5, and a spring 6; two ends of the substrate 7 are respectively provided with a hollow part 8 configured to place the joint 5 and the spring 6, the periphery of the joint 5 is provided with a groove 13, the joint 5 is provided with a clamping hole 14 vertical to the groove 13, and two ends of the spring are respectively sleeved on the joint 5 and the substrate 7, to limit the joint 5.

In the present embodiment, the joint 5 and the spring 6 are placed and fixed at two ends of the substrate 7, two joints 5 are respectively connected with the motor 1 and the adaptor 3, the first joint 21 and the coupling shaft 31 of the adaptor 3 are in inserting connection and fixation in a manner of capable of rotating around a shaft, the second joint 22 and the output shaft of the motor 1 is in inserting connection and fixation in a manner of capable of relatively rotating around a shaft, the adaptor 3 is connected with the air duct baffle 4, such that the motor 1 and the air duct baffle 4 are connected with the connecting beam 2, the motor 1 drives the connecting beam 2 to rotate, to further drive the adaptor 3 and the air duct baffle 4 to rotate, and realize the opening and closing of the air duct.

In the present embodiment, the substrate 7 is of a rectangle shape, the left and right ends of the substrate 7 are respectively transited in an arc shape, the left and right ends of the substrate 7 are provided with a hollow part 8, the joint 5 and the spring 6 are placed in the hollow part 8, and are fixedly connected with the substrate 7, such that the motor 1 and the air duct baffle 4 are connected with the connecting beam 2.

In the present embodiment, the hollow part 8 is set to be stair-stepping along an axis, and includes in sequence a small caliber part 18, a large caliber part 19 and a connecting part 20, the caliber of the small caliber part 18 is smaller than the caliber of the large caliber part 19, the shape of the large caliber part 19 is matched with the joint 5, the side wall of the joint 5 is provided with a groove 13, the shape of the small caliber side is matched with the groove 13 of the joint 5; and the connecting part 20 is provided with a spring extending head 15 protruding towards the direction of the small caliber part 18, to install the spring 6.

In the present embodiment, the middle position of the substrate 7 is provided with a reinforcing bulge 16 which protrudes outwards, the reinforcing bulge 16 is trapezoidal, the periphery of the substrate 7 is folded downwards to form a folded edge 17, to strengthen the intensity of the substrate 7, and when the motor 1 drives the connecting beam 2 to rotate, the substrate 7 will not deform.

In the present embodiment, the front part of the joint 5 is transited in an arc shape, the upper and lower ends of the middle part are respectively provided with a fixed boss 12 which protrudes outwards, such that the thickness of the joint 5 is larger than the thickness of the substrate 7. The middle part of the side wall of the joint 5 is concave inwards to form a groove 13, the groove 13 is matched with the small caliber part 18 of the hollow part 8, such that the joint 5 is connected with the substrate 7 in an inserting manner through the groove 13, and the arc-shaped front part of the joint 5 enables the inserting connection between the joint 5 and the substrate 7 to be tighter, thereby facilitating the installation and disassembly of the joint 5.

In the present embodiment, the rear end of the joint 5 is provided with a spring installation joint 11 which protrudes outwards along an axis, the spring extending head 15 of the connecting part 20 is corresponding to the installation joint of the spring 6. One end of the spring 6 is sleeved on the spring installation joint 11 of the joint 5, and is abutted against the rear end of the joint 5, the other end is sleeved on the spring extending head 15 of the hollow part 8 and is abutted against the substrate 7, such that the inserting connection between the joint 5 and the substrate 7 under the effect of a spring is tighter, and falling off of the joint 5 is prevented.

Figure 19:
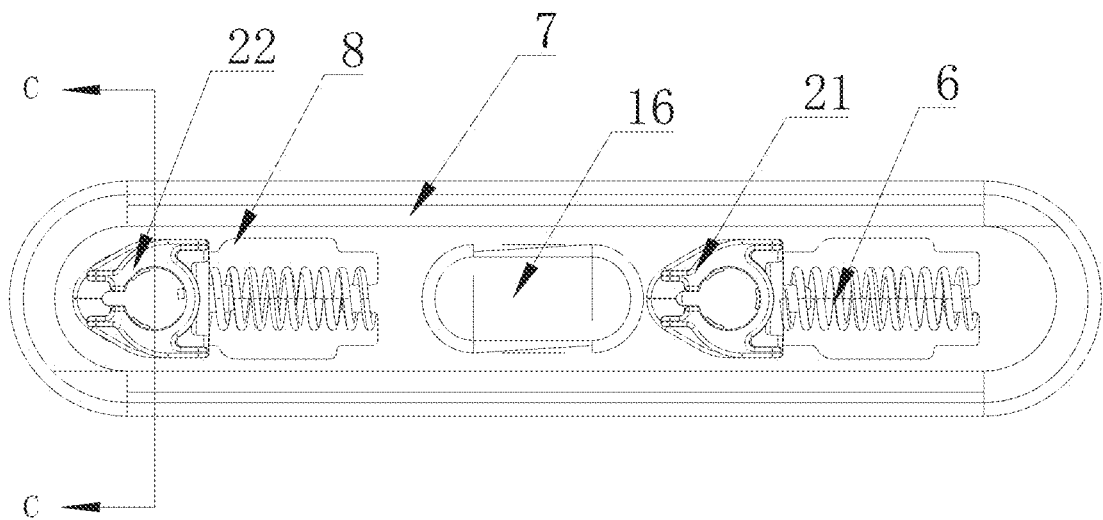
FIG. 19 is a top view of a connecting beam in an embodiment of the present disclosure.
Figure 20:
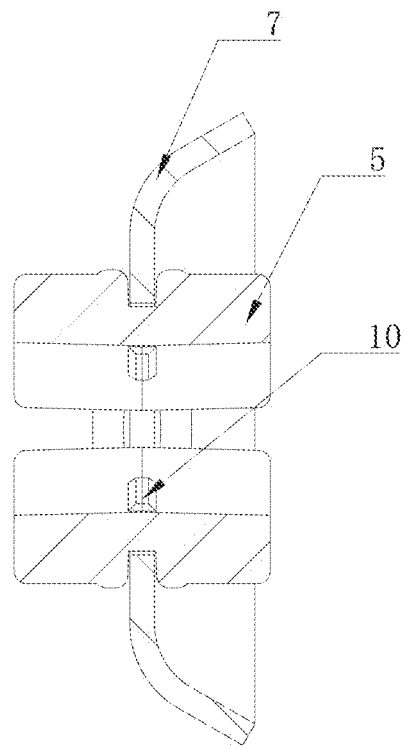
FIG. 20 is a sectional view along direction C-C in FIG. 19.
Figure 21:
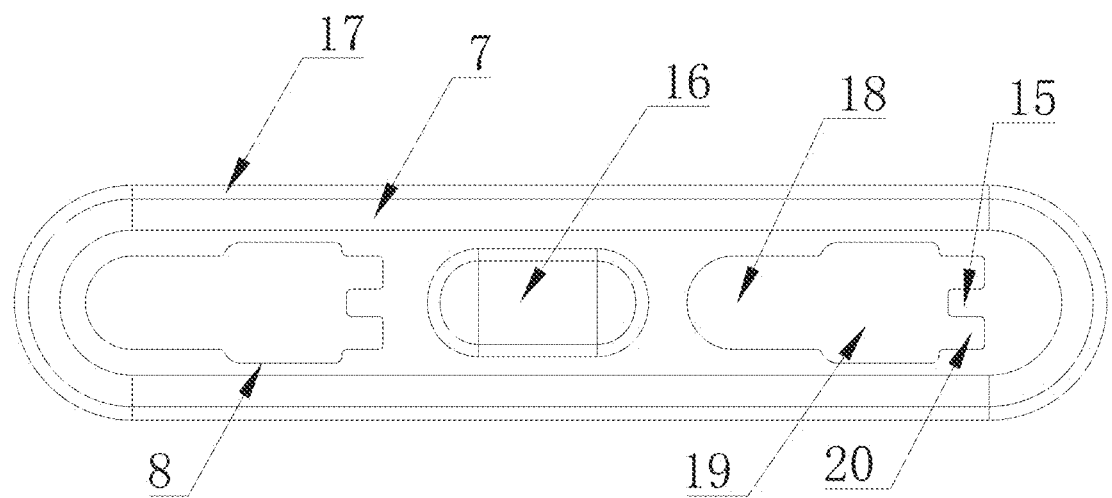
FIG. 21 is a structural schematic diagram of a substrate in an embodiment of the present disclosure.

As shown in FIG. 19 to FIG. 21, the installation manner between the joint 5 and the connecting beam 2 includes the following steps:

Firstly, the joint 5 is embedded into a large caliber part 19 of the hollow part 8 of the connecting beam 2, the front end of the joint 5 is towards the small caliber part 18 of the hollow part 8, and the large caliber part 19 is matched with the joint 5.

Secondly, the groove 13 of the joint 5 is aligned with the small caliber part 18 of the hallow part 8, to push forwards until no further advance is possible, then the joint 5 is completely connected with the substrate 7 in an inserting manner.

Finally, one end of the compressed spring 6 is installed on the spring installation joint 11 of the joint 5, the other end is installed on the protruding spring extending head 15 of the connecting part 20, and the joint 5 is limited through a tension of the compressed spring 6.

Embodiment 6

As shown in FIG. 1 to FIG. 26, the present embodiment introduces a clothing treating device which includes a first clothing treating bucket 700 and a second clothing treating bucket 800, the first clothing treating bucket 700 and the second clothing treating bucket 800 are respectively provided with a clothes delivery opening, to deliver to-be-treated clothes to the first clothing treating bucket 700 and the second clothing treating bucket 800 respectively. The first clothing treating bucket 700 and/or the second clothing treating bucket 800 can only possess a drying function, and can also possess a drying function and a washing function simultaneously; of course, under the premise of possessing a drying function and a washing function, other clothing treating functions can also be integrated, such as a steam washing function, an ultraviolet anti-virus function.

Through respectively arranging an air duct conversion device at two ends of the air duct, a single air duct can provide a circulating air flow for drying clothes to the first clothing treating bucket or the second clothing treating bucket, respectively, thereby further achieving the purpose of sharing one air duct by two sets of clothing drying equipment, and achieving the purpose of sharing the same clothing drying air duct on the clothing treating device possessing two sets of clothing treating equipment.

As shown in FIG. 22 to FIG. 26, in the present embodiment, the clothing treating device is further provided with an air duct 100, the air inlet end of the air duct 100 is respectively communicated with the first air inlet 300 of the first clothing treating bucket 700 and the second air inlet 400 of the second clothing treating bucket 800 through an air duct conversion device 210 at the air inlet end, and the air duct conversion device 220 at the air outlet end of the air duct 100 is respectively communicated with the first air outlet 500 of the first clothing treating bucket 700 and the second air outlet 600 of the second clothing treating bucket 800.

In the present embodiment, the air duct conversion device 210 at the air inlet end and the air duct conversion device 220 at the air outlet end are both constituted by the air duct conversion device 200 of any of the above embodiments 1-5, the air duct conversion device 200 includes an air duct baffle 4 which is installed on the air duct in a manner of capable of rotating relatively. The output shaft of the motor 1 is connected with the air duct baffle 4 through a linkage mechanism, to drive the air duct baffle 4 to rotate around a shaft through a linkage mechanism in the rotating process of the output shaft of the motor 1, such that the air duct baffle 4 switches to move between the first position and the second position.

In the present embodiment, at the first position of the air duct baffle 4 of the air duct conversion device 210 at the air inlet end, the first air inlet 300 is closed and the second air inlet 400 is open, at the first position of the air duct baffle 4 of the air duct conversion device 220 at the air outlet end, the first air outlet 500 is closed and the second air outlet 600 is open, at the second position of the air duct baffle 4 of the air duct conversion device 210 at the air inlet end, the first air inlet 300 is open and the second air inlet 400 is closed, at the second position of the air duct baffle 4 of the air duct conversion device 220 at the air outlet end, the first air outlet 500 is open and the second air outlet 600 is closed.

Figure 22:
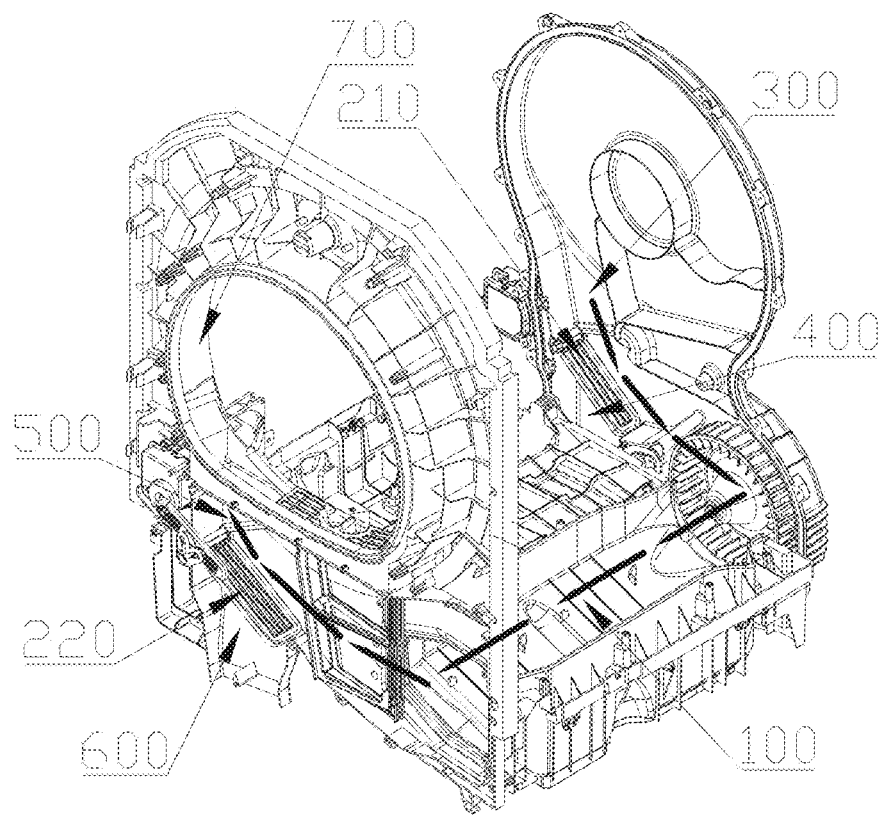
FIG. 22 is a structural schematic diagram when clothes are dried through a first clothing treating bucket of a clothing treating device in an embodiment of the present disclosure.
Figure 23:
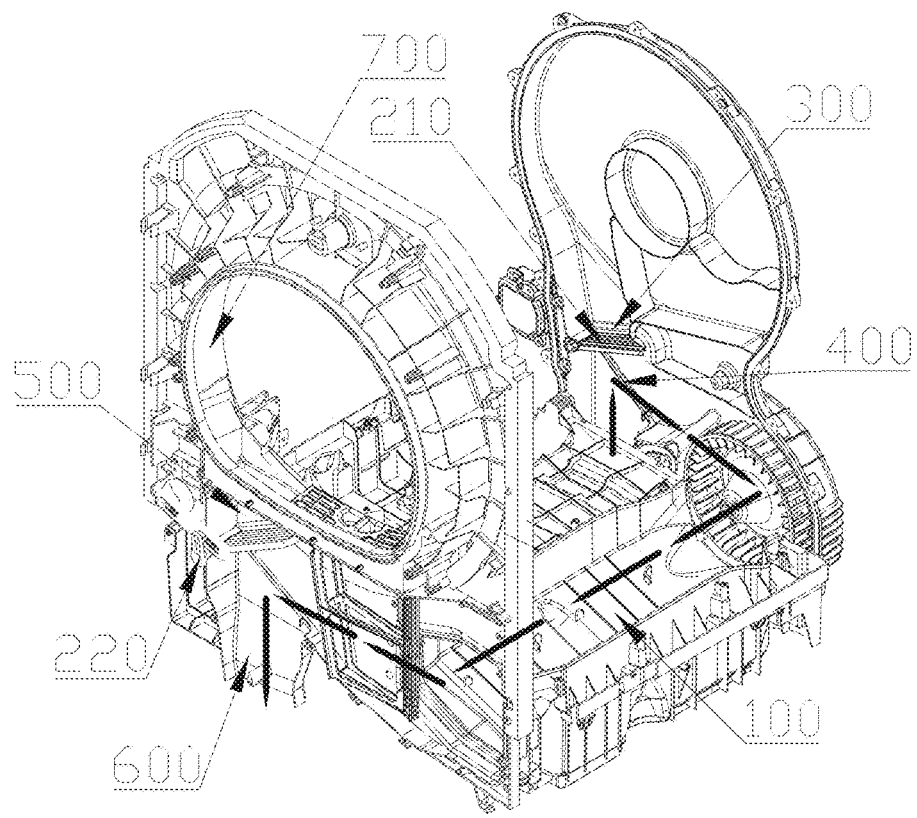
FIG. 23 is a structural schematic diagram when clothes are dried through a second clothing treating bucket of a clothing treating device in an embodiment of the present disclosure.
Figure 24:
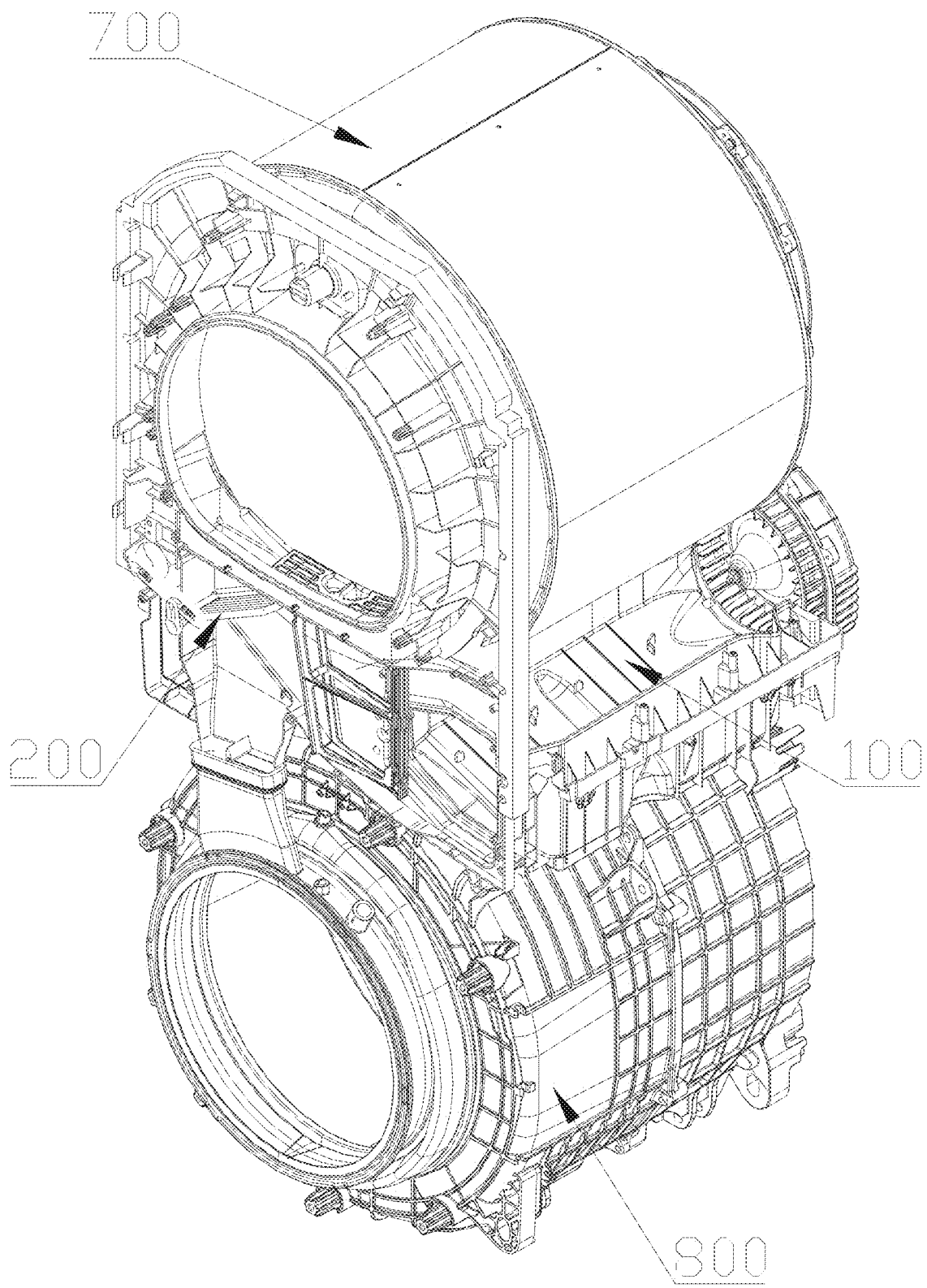
FIG. 24 is a structural schematic diagram of a clothes treating device in an embodiment of the present disclosure.

As shown in FIG. 22 and FIG. 23, in the present embodiment, the first clothing treating bucket 700 is arranged above the second clothing treating bucket 800, the air duct 100 is arranged horizontally between the first clothing treating bucket 700 and the second clothing treating bucket 800. The axis of the first clothing treating bucket 700 is set to be in parallel with the axis of the second clothing treating bucket 800, and clothes delivery openings of the two are both arranged at the same end, and the end of the air duct 100 at the clothes delivery opening side is the air outlet end, and the end of the air duct 100 relatively far away from the clothes delivery opening side is the air inlet end.

In the present embodiment, the air inlet end of the air duct 100 is provided with a first air inlet 300 communicated upwards with the first clothing treating bucket 700, and a second air inlet 400 communicated downwards with the second clothing treating bucket 800. The air duct conversion device 210 at the air inlet end is installed in the middle of the air inlet end of the air duct 100, such that the first air inlet 300 is correspondingly closed when the air duct baffle 4 of the air duct conversion device 210 at the air inlet end rotates upwards to the first position, and the second air inlet 400 is correspondingly closed when the air duct baffle 4 of the air duct conversion device 210 at the air inlet end rotates downwards to the second position.

In the present embodiment, the air outlet end of the air duct 100 is provided with a first air outlet 500 communicated upwards with the first clothing treating bucket 700, and a second air outlet 600 communicated downwards with the second clothing treating bucket 800, the air duct conversion device 220 at the air outlet end is installed in the middle of the air outlet end of the air duct 100, such that the first air outlet 500 is correspondingly closed when the air duct baffle 4 of the air duct conversion device 220 at the air outlet end rotates upwards to the first position, and the second air outlet 600 is correspondingly closed when the air duct baffle 4 of the air duct conversion device 220 at the air outlet end rotates downwards to the second position.

In the present embodiment, the air duct 100 is successively internally installed with, along the direction of an air flow, a condensing device for condensing the air flow that flows through, and a heating device for heating the air flow that flows through. Through the above setting, the circulating air flow flowing into the air duct 100 from the first clothing treating bucket 700 or the second clothing treating bucket 800 is firstly processed through a condensing device, to condense and precipitate the water vapor contained in the circulating air flow; and then the circulating air flow after condensing treatment is processed through a heating device, and the circulating air flow with a temperature rise flows back to the first clothing treating bucket 700 or the second clothing treating bucket 800 to dry clothes inside the first clothing treating bucket 700 or the second clothing treating bucket 800.

Figure 25:
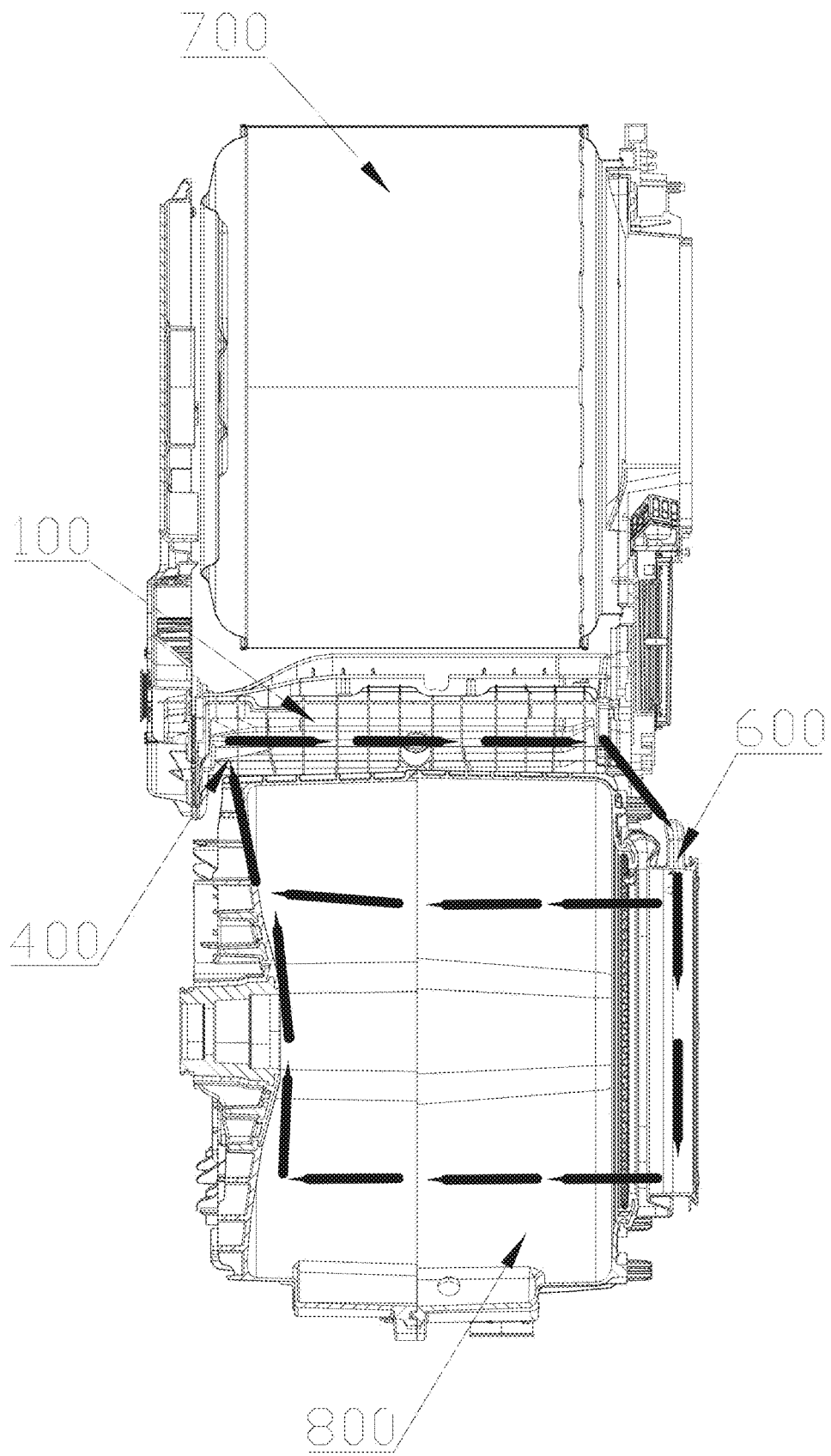
FIG. 25 is a cross-section diagram when clothes are dried through a first clothing treating bucket of a clothing treating device in an embodiment of the present disclosure.
Figure 26:
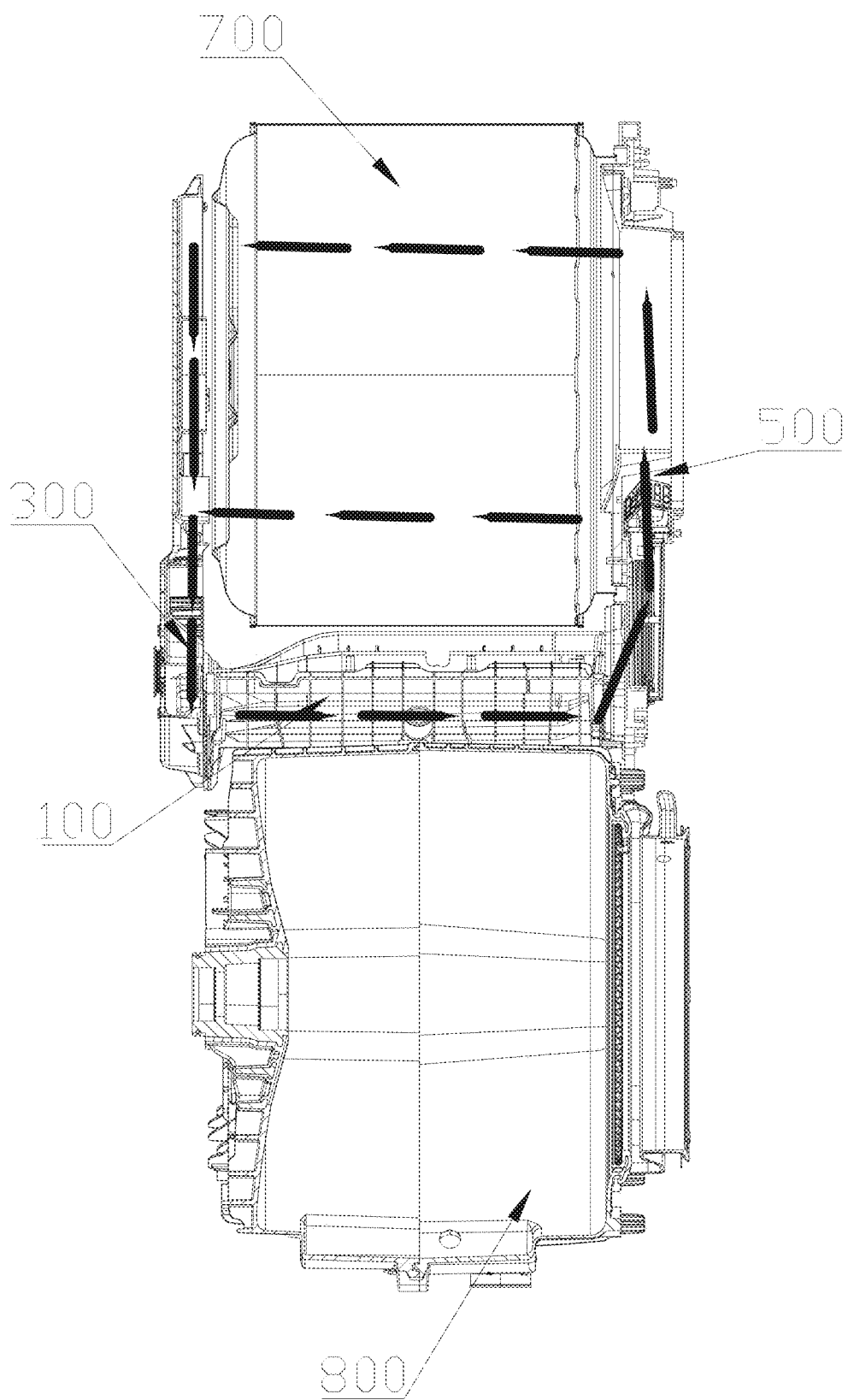
FIG. 26 is a cross-section diagram when clothes are dried through a second clothing treating bucket of a clothing treating device in an embodiment of the present disclosure.

In the present embodiment, as shown in FIG. 22 and FIG. 25, when the clothes inside the first clothing treating bucket 700 is under drying, the air duct baffle 4 of the air duct converting device 210 at the air inlet end and the air duct baffle 4 of the air duct conversion device 220 at the air outlet end are both arranged at the second position, such that the air duct 100 and the first clothing treating device 700 form a circulating channel. As shown in FIG. 23 and FIG. 26, when the clothes inside the second clothing treating bucket 800 is under drying, the air duct baffle 4 of the air duct converting device 210 at the air inlet end and the air duct baffle 4 of the air duct conversion device 220 at the air outlet end are both arranged at the first position, such that the air duct 100 and the second clothing treating device 800 form a circulating channel.

What is described above is merely the preferred embodiments of the present disclosure, rather than limiting the present disclosure in any form, although the present disclosure has been disclosed above with the preferred embodiments, the preferred embodiments are not used for limiting the present disclosure, those skilled in the art can make some changes or modify into equivalent embodiments with equal changes by utilizing the above suggested technical contents without departing from the scope of the technical solution of the present disclosure, and the contents not departing from the technical solution of the present disclosure, any simple amendments, equivalent changes or modifications made to the above embodiments based on the technical essence of the present disclosure shall all fall within the scope of the solution of the present disclosure.

The invention claimed is:

1. An air duct conversion device, comprising:
an air duct baffle installed in an air duct and configured to relatively rotate;
an output shaft of a motor connected with the air duct baffle through a linkage mechanism for driving the air duct baffle to rotate through the linkage mechanism in a rotating process of the output shaft of the motor, the air duct baffle configured to move between a first position and a second position; wherein
the linkage mechanism comprises an adaptor and a connecting beam which are connected in a relatively rotating manner, the connecting beam is connected with the output shaft of the motor and configured to relatively rotate around the output shaft of the motor, and the adaptor is connected with a baffle shaft of the air duct baffle and configured to be incapable of relatively rotating;
a first shaft section and a second shaft section are arranged in sequence from outside to inside at an end part of the baffle shaft which penetrates out of the air duct,
a cross section of the second shaft section is noncircular, an inner circumferential surface of a coupling sleeve of the adaptor is correspondingly fit and connected by insertion with an outer wall of the second shaft section, so that the second shaft section inserts and is fixedly connected with the adaptor to be incapable of rotating relatively;
the coupling sleeve is internally provided with a jack socket for the first shaft section passing through, an outside of the first shaft section is provided with threads, the first shaft section and a lock nut are in threaded engagement and fixed, and the adaptor is fastened and fixed between the lock nut and the second shaft section;
a peripheral diameter of the second shaft section is larger than a diameter of the jack socket;
the adaptor is provided with a countersink groove for an installation of the lock nut, the countersink groove is set to be co-axial with the coupling sleeve, and is arranged at two opposite sides of the adaptor, the countersink groove communicates with the coupling sleeve through the jack socket, and the countersink groove, the jack socket and the coupling sleeve are all arranged coaxially.

2. The air duct conversion device according to claim 1, wherein two ends of the adaptor are respectively provided with a coupling shaft and the coupling sleeve, the coupling shaft and the connecting beam are connected with each other and configured to rotate relative to the coupling shaft, and the coupling sleeve and the air duct baffle are fixedly connected with each other to be incapable of rotating relatively; an extension direction of the adaptor is vertical to an axial direction of the baffle shaft; and an axis of the coupling shaft and an axis of the coupling sleeve are in parallel with each other and are both set to be vertical to the extension direction of the adaptor;
the axis of the coupling shaft and the axis of the coupling sleeve are in parallel with each other and are both set to be on a same side of the adaptor; and the axis of the coupling shaft and the axis of the coupling sleeve are in parallel with each other and are both set to be vertical to the extension direction of the adaptor.

3. The air duct conversion device according to claim 2, wherein two ends of the connecting beam are respectively fixedly installed with a first joint and a second joint, the first joint and the coupling shaft of the adaptor are connected and fixed with each other by insertion and configured to relatively rotate, and the second joint and the output shaft of the motor are connected and fixed with each other by insertion and configured to relatively rotate;

each of a periphery of the first joint and the second joint is provided with a groove for connecting with the connecting beam by insertion, each of the first joint and the second joint is provided with a clamping hole vertical to the groove, and the first joint and the second joint are respectively installed and fixed in hollow parts at two ends of the connecting beam.

4. The air duct conversion device according to claim 3, wherein the output shaft of the motor is of an eccentric shaft structure, the eccentric shaft structure comprises an eccentric shaft section which rotates around a motor center, the eccentric shaft section and the second joint of the connecting beam is connected and fixed with each other in an inserting manner and configured to relatively rotate, to drive the connecting beam to move in the rotating process of the eccentric shaft section, and further to drive the air duct baffle to rotate around the baffle shaft through the adaptor.

5. The air duct conversion device according to claim 2, wherein the coupling sleeve is a sleeve structure which protrudes and extends towards one side from the adaptor, and one end of the sleeve structure is open to allow corresponding insertion of the baffle shaft of the air duct conversion device, and an other end of the sleeve structure is provided with the jack socket for the baffle shaft penetrating out;

a periphery of the coupling sleeve is provided with reinforcing ribs which are distributed at intervals and extend along an axis of the sleeve structure, and a lower end of each of the reinforcing ribs extends to the adaptor, and an upper end extends to an end part of the sleeve structure, an inner circumferential cross section of the sleeve structure is non-circular, so that baffle shaft is correspondingly connected in an inserting manner to form a fixation configured to be incapable of rotating relatively;

the inner circumferential cross section of the sleeve structure is part of a circle intercepted by two parallel line segments.

6. The air duct conversion device according to claim 5, wherein the side wall of the air duct is provided with a first retaining rib and a second retaining rib which are crossed and arranged at an angle, and the installation groove is arranged at a position at which the first retaining rib and the second retaining rib are intersected;

an axis of the bearing sleeve installed in the installation groove is coincided with an intersection point of extension directions of the first retaining rib and the second retaining rib;

the first retaining rib and the second retaining rib protrude towards an inside of the air duct from the side wall of the air duct, and the first retaining rib extends along the first position of the air duct baffle of the air duct conversion device, and the second retaining rib extends along the second position of the air duct baffle of the air duct conversion device, so that the air duct baffle rotates around the baffle shaft between the first retaining rib and the second retaining rib.

7. The air duct conversion device according to claim 2, wherein the coupling shaft is a columnar structure which protrudes and extends towards one side of the adaptor, an axis of the columnar structure is vertical to the extension direction of the adaptor, a height of the columnar structure is set to be same with a height of the reducing shaft, and a cross section of the columnar structure is circular;

a middle of reducing shaft with the columnar structure is provided with a ring of groove extending along an outer wall of the adaptor, for corresponding inserting the bulge on the joint of the coupling beam; and an extending surface of the groove is vertical to an axis of the reducing shaft.

8. The air duct conversion device according to claim 1, wherein the connecting beam comprises a substrate, a joint and a spring, two ends of the substrate are respectively provided with a hollow part to place the joint and the spring;

a periphery of the joint is provided with a groove, and the joint is provided with the jack socket vertical to the groove;

two ends of the spring are respectively sleeved on the joint and the substrate, to limit the joint;

the hollow part of the substrate is arranged at each of the two ends of the substrate in a same direction;

the hollow part is arranged to be a stepped shape along an axis, the hollow part comprises a small caliber part, a big caliber part and a connecting part in sequence, a caliber of the small caliber part is smaller than a caliber of the big caliber part, the big caliber part of the hollow part is matched with the joint, and the small caliber part is matched with the groove of the joint, the connecting part of the hollow part is provided with a spring extending head which protrudes towards the small caliber part along an axial direction;

the substrate is rectangular, left and right ends of the substrate are in an arc shape; a middle of the substrate is provided with a trapezoid reinforcing bulge which protrudes outwards, a periphery of the substrate is folded downwards to form a folded edge, to strengthen an intensity of the substrate.

9. The air duct conversion device according to claim 8, wherein a front part of the joint is in an arc shape, each of two ends of a middle part of the joint respectively protrude outwards to form a fixed boss, so that a thickness of the joint is larger than a thickness of the substrate, the front part of the joint is disconnected along an axis direction, and a front part and a rear part of the fixed boss are both provided with two axially symmetrical claws, to control to open and close the front part of the joint;

a middle position of a periphery of the joint is concave inwards to form the groove, the groove is matched with the hollow part of the connecting beam, so that the joint is connected with the connecting beam in an inserting manner through the groove, the clamping hole of the joint penetrates through the middle part, and the clamping hole is of a cylindrical structure.

10. The air duct conversion device according to claim 9, wherein a middle position of a side wall inside the clamping hole is provided with bulges which protrude, and the bulges are distributed uniformly in circumferential direction, so as to install and lock the motor and the air duct baffle, the clamping hole is sunken towards a side with the arc shaped shape of the joint to form a concave opening;

a rear part of the joint is provided with a spring installation joint which protrudes outwards, and an end, far away from the small caliber part, of the hollow part is correspondingly provided with a spring extending head, so that the rear part of the joint is connected with the connecting beam through the spring; one end of the spring is sleeved on the spring installation joint of the joint and is abutted against the rear end of the joint, and an other end is sleeved on the spring extending head of the hollow part and is abutted against the substrate.

11. The air duct conversion device according to claim 1, wherein a side wall of the air duct is provided with an installation groove, the installation groove is connected with a bearing sleeve with a non-circular periphery, and the bearing sleeve is provided with an installation hole for connecting the baffle shaft of the air duct baffle in an inserting manner;
   a cross section of an inner wall of the installation groove is a square, and a peripheral cross section of the bearing sleeve is a square which is correspondingly matched and fit with the installation groove;
   the peripheral cross section of the bearing sleeve is a square with a chamfer arranged at a corner, and the corner is any shape selected from a circular arc and a straight line.

12. The air duct conversion device according to claim 11, wherein an extension direction of the installation groove is vertical to the side wall of the air duct, the hollow part of the installation groove allows the bearing sleeve to be fixed in an inserting connection and fixation of the bearing sleeve, an axial direction of the installation hole of the bearing sleeve is set to be vertical to the side wall of an air duct;
   the peripheral cross section of the bearing sleeve is a regular hexagon, a cross section of the inner wall of the installation groove is a square, and a distance between two opposite sides of the regular hexagon is equal to a length of a side of the square.

13. The air duct conversion device according to claim 11, wherein the side wall of the air duct is provided with a first retaining rib and a second retaining rib which are crossed and arranged at an angle, and the installation groove is arranged at a position at which the first retaining rib and the second retaining rib are intersected;
   an axis of the bearing sleeve installed in the installation groove is coincided with an intersection point of extension directions of the first retaining rib and the second retaining rib;
   the first retaining rib and the second retaining rib protrude towards an inside of the air duct from the side wall of the air duct, and the first retaining rib extends along the first position of the air duct baffle of the air duct conversion device, and the second retaining rib extends along the second position of the air duct baffle of the air duct conversion device, so that the air duct baffle rotates around the baffle shaft between the first retaining rib and the second retaining rib.

14. The air duct conversion device according to claim 1, wherein the air duct baffle comprises,
   a baffle body, wherein one side of the baffle body is provided with a baffle shaft which protrudes towards two ends and the baffle shaft is inserted and fixed to two side walls of the air duct correspondingly, the baffle is installed in the air duct configured to rotate relatively; and one end of the baffle shaft penetrates through the air duct and is fixedly connected with the adaptor;
   a frame, wherein the frame wraps three sides, except the baffle shaft, of the baffle body.

15. The air duct conversion device according to claim 14, wherein side grooves which are concave inwards are arranged at a side, opposite from the baffle body, of the baffle shaft, the side grooves are distributed uniformly along an axial direction, and the side grooves are matched with a fixed device for fixing the air duct conversion device;
   a shape and a size of the baffle body are matched with a shape and a size of an inlet and an outlet of the air duct, to open or close the air duct, the baffle body is provided with horizontal reinforcing ribs distributed uniformly;
   an edge of the baffle body is provided with openings uniformly distributed, to arrange the frame in injection molding, a periphery of the frame is concave inwards to form a V-shaped groove, a circumference of the frame is matched with the openings of the baffle body, for installing the baffle body.

16. The air duct conversion device according to claim 15, wherein the side wall of the air duct is provided with a first retaining rib and a second retaining rib which are crossed and arranged at an angle, and the installation groove is arranged at a position at which the first retaining rib and the second retaining rib are intersected;
   an axis of the bearing sleeve installed in the installation groove is coincided with an intersection point of extension directions of the first retaining rib and the second retaining rib;
   the first retaining rib and the second retaining rib protrude towards an inside of the air duct from the side wall of the air duct, and the first retaining rib extends along the first position of the air duct baffle of the air duct conversion device, and the second retaining rib extends along the second position of the air duct baffle of the air duct conversion device, so that the air duct baffle rotates around the baffle shaft between the first retaining rib and the second retaining rib.

17. The air duct conversion device according to claim 14, wherein the side wall of the air duct is provided with a first retaining rib and a second retaining rib which are crossed and arranged at an angle, and the installation groove is arranged at a position at which the first retaining rib and the second retaining rib are intersected;
   an axis of the bearing sleeve installed in the installation groove is coincided with an intersection point of extension directions of the first retaining rib and the second retaining rib;
   the first retaining rib and the second retaining rib protrude towards an inside of the air duct from the side wall of the air duct, and the first retaining rib extends along the first position of the air duct baffle of the air duct conversion device, and the second retaining rib extends along the second position of the air duct baffle of the air duct conversion device, so that the air duct baffle rotates around the baffle shaft between the first retaining rib and the second retaining rib.

18. An air duct conversion device, comprising:
   an air duct baffle installed in an air duct and configured to relatively rotate;
   an output shaft of a motor connected with the air duct baffle through a linkage mechanism for driving the air duct baffle to rotate through the linkage mechanism in a rotating process of the output shaft of the motor, the air duct baffle configured to move between a first position and a second position,
   wherein a side wall of the air duct is provided with an installation groove, the installation groove is connected with a bearing sleeve with a non-circular periphery, and the bearing sleeve is provided with an installation hole for connecting the baffle shaft of the air duct baffle in an inserting manner;

a cross section of an inner wall of the installation groove is a square, and a peripheral cross section of the bearing sleeve is a square which is correspondingly matched and fit with the installation groove;

the peripheral cross section of the bearing sleeve is a square with a chamfer arranged at a corner, and the corner is any shape selected from a circular arc and a straight line.

19. An air duct conversion device, comprising:

an air duct baffle installed in a n air duct and configured to relatively rotate;

an output shaft of a motor connected with the air duct baffle through a linkage mechanism for driving the air duct baffle to rotate through the linkage mechanism in a rotating process of the output shaft of the motor, the air duct baffle configured to move between a first position and a second position, wherein the air duct baffle comprises, a baffle body, wherein one side of the baffle body is provided with a baffle shaft which protrudes towards two ends and the baffle shaft is inserted and fixed to two side walls of the air duct correspondingly, the baffle is installed in the air duct configured to rotate relatively; and one end of the baffle shaft penetrates through the air duct and is fixedly connected with the adaptor; a frame, wherein the frame wraps three sides, except the baffle shaft, of the baffle body, wherein side grooves which are concave inwards are arranged at a side, opposite from the baffle body, of the baffle shaft, the side grooves are distributed uniformly along an axial direction, and the side grooves are matched with a fixed device for fixing the air duct conversion device; a shape and a size of the baffle body are matched with a shape and a size of an inlet and an outlet of the air duct, to open or close the air duct, the baffle body is provided with horizontal reinforcing ribs distributed uniformly; an edge of the baffle body is provided with openings uniformly distributed, to arrange the frame in injection molding, a periphery of the frame is concave inwards to form a V-shaped groove, a circumference of the frame is matched with the openings of the baffle body, for installing the baffle body.

20. The air duct conversion device according to claim 19, wherein the side wall of the air duct is provided with a first retaining rib and a second retaining rib which are crossed and arranged at an angle, and the installation groove is arranged at a position at which the first retaining rib and the second retaining rib are intersected;

an axis of the bearing sleeve installed in the installation groove is coincided with an intersection point of extension directions of the first retaining rib and the second retaining rib;

the first retaining rib and the second retaining rib protrude towards an inside of the air duct from the side wall of the air duct, and the first retaining rib extends along the first position of the air duct baffle of the air duct conversion device, and the second retaining rib extends along the second position of the air duct baffle of the air duct conversion device, so that the air duct baffle rotates around the baffle shaft between the first retaining rib and the second retaining rib.

* * * * *